United States Patent
Tomiyasu

(10) Patent No.: US 12,437,151 B2
(45) Date of Patent: Oct. 7, 2025

(54) INFORMATION PROCESSING DEVICE, INFORMATION PROCESSING SYSTEM, AND INFORMATION PROCESSING METHOD

(71) Applicant: FRONTEO, Inc., Tokyo (JP)

(72) Inventor: Keisuke Tomiyasu, Tokyo (JP)

(73) Assignee: FRONTEO, Inc., Tokyo (JP)

( * ) Notice: Subject to any disclaimer, the term of this patent is extended or adjusted under 35 U.S.C. 154(b) by 0 days.

(21) Appl. No.: 18/658,196

(22) Filed: May 8, 2024

(65) Prior Publication Data

US 2024/0378383 A1    Nov. 14, 2024

(30) Foreign Application Priority Data

May 10, 2023   (JP) ................ 2023-078058

(51) Int. Cl.
| | |
|---|---|
| G06F 40/268 | (2020.01) |
| G06F 16/35  | (2025.01) |
| G06F 16/93  | (2019.01) |
| G06N 20/00  | (2019.01) |

(52) U.S. Cl.
CPC ........... *G06F 40/268* (2020.01); *G06F 16/93* (2019.01)

(58) Field of Classification Search
None
See application file for complete search history.

(56) References Cited

U.S. PATENT DOCUMENTS

| | | |
|---|---|---|
| 8,996,350 B1 | 3/2015 | Dub et al. |
| 2020/0364403 A1 | 11/2020 | Choi et al. |

FOREIGN PATENT DOCUMENTS

| | | |
|---|---|---|
| JP | 2022-148430 A | 10/2022 |
| JP | 2023-27697 A | 3/2023 |
| WO | 2013080365 A1 | 6/2013 |
| WO | 2015166606 A1 | 11/2015 |

OTHER PUBLICATIONS

NPL WO: 2015/166606—English Translation (Year: 2015).*
NPL WO: 2013/080365—English Translation (Year: 2013).*
Waqar Ali Narejo; Sindhi Morphological Analysis: An Algorithm for Sindhi Word Segmentation into Morphemes; International Journal of Computer Science and Information Security (IJCSIS); vol. 14;No. 6;June ; pp. 1-10 (Year: 2016).*
Japanese Office Action for Japanese Patent Application No. 2023-078058 issued Jun. 20, 2023.

* cited by examiner

*Primary Examiner* — Albert M Phillips, III
*Assistant Examiner* — Jermaine A Mincey
(74) *Attorney, Agent, or Firm* — Sughrue Mion, PLLC

(57) ABSTRACT

An information processing device includes: an acquisition unit configured to acquire document data; an analysis processing unit configured to perform morphological analysis of the document data; a feature determining unit configured to determine a feature corresponding to the document data based on a result of the morphological analysis and a hash function; an export unit configured to output export data that is data based on the feature to a second information processing device; an import unit configured to acquire a result of processing performed by the second information processing device based on the export data; and a processing unit configured to perform processing based on the result of the processing acquired by the import unit.

12 Claims, 12 Drawing Sheets

(Impossible, is, nothing) →

|  | 00001 (Impossible) | ... | 13201 (Stay) | 13203 (foolish) |
|---|---|---|---|---|
| DOCUMENT DATA A | 1 |  | 0 | 0 |

(Think, different) →

|  | 00001 (Impossible) | ... | 13201 (Stay) | 13203 (foolish) |
|---|---|---|---|---|
| DOCUMENT DATA B | 0 |  | 0 | 0 |

(Find, purpose, the, means, will, follow) →

|  | 00001 (Impossible) | ... | 13201 (Stay) | 13203 (foolish) |
|---|---|---|---|---|
| DOCUMENT DATA C | 0 |  | 0 | 0 |

(Stay, hungry, Stay, foolish) →

|  | 00001 (Impossible) | ... | 13201 (Stay) | 13203 (foolish) |
|---|---|---|---|---|
| DOCUMENT DATA D | 0 |  | 2 | 1 |

FIG. 17A

|  | FEATURE 1 | FEATURE 2 | FEATURE 3 | FEATURE 4 |
|---|---|---|---|---|
| DOCUMENT 1 | 100 | 3 | 5000 | 0 |
| DOCUMENT 2 | 300 | 2 | 300 | 1 |
| DOCUMENT 3 | 500 | 1 | 1 | 0 |
| $\|L2\|$ | 591 | 3.7 | 5009 | 1 |

FIG. 17B

|  | FEATURE 1 | FEATURE 2 | FEATURE 3 | FEATURE 4 | $\|L2\|^{\wedge}2$ |
|---|---|---|---|---|---|
| DOCUMENT 1 | 0.15 | 0.69 | 0.86 | 0.00 | 1.25 |
| DOCUMENT 2 | 0.44 | 0.46 | 0.05 | 0.87 | 1.16 |
| DOCUMENT 3 | 0.73 | 0.23 | 0.00 | 0.00 | 0.59 |
| $\|L2\|^{\wedge}2$ | 0.75 | 0.75 | 0.75 | 0.75 | 3 |

FIG. 17C

|  | FEATURE 1 | FEATURE 2 | FEATURE 3 | FEATURE 4 | $\|L2\|^{\wedge}2$ |
|---|---|---|---|---|---|
| DOCUMENT 1 | 0.13 | 0.62 | 0.77 | 0.00 | 1 |
| DOCUMENT 2 | 0.41 | 0.43 | 0.05 | 0.81 | 1 |
| DOCUMENT 3 | 0.95 | 0.30 | 0.00 | 0.00 | 1 |
| $\|L2\|^{\wedge}2$ | 1.09 | 0.65 | 0.59 | 0.65 | 3 |

INFORMATION PROCESSING DEVICE, INFORMATION PROCESSING SYSTEM, AND INFORMATION PROCESSING METHOD

CROSS-REFERENCE TO RELATED APPLICATION

The present application claims priority from Japanese Application JP2023-078058, filed May 10, 2023, the content of which is hereby incorporated by reference into this application.

BACKGROUND OF THE INVENTION

1. Field of the Invention

The present invention relates to, for example, information processing devices, information processing systems, and information processing methods.

2. Description of the Related Art

Techniques have been known for processing document data by machine learning.

For instance, Japanese Unexamined Patent Application Publication No. 2022-148430 discloses a document information extracting system for updating a parameter on the basis of either an action type or a weight of a feature to be evaluated in determining a feature of a model.

SUMMARY OF THE INVENTION

In evaluating the feature, the technique of Japanese Unexamined Patent Application Publication No. 2022-148430 factors in, for example, similarity relationships in accordance with a thesaurus and other data, but fails to factor in cases where the document data, which is confidential information, is processed by an external device.

Some aspects of the present disclosure can provide, for example, an information processing device, an information processing system, and an information processing method, all of which are capable of securely performing concerted operations across a plurality of information processing devices.

The present disclosure, in an aspect thereof, relates to an information processing device including: an acquisition unit configured to acquire document data; an analysis processing unit configured to perform morphological analysis of the document data; a feature determining unit configured to determine a feature corresponding to the document data based on a result of the morphological analysis and a hash function; an export unit configured to output export data that is data based on the feature to a second information processing device; an import unit configured to acquire a result of processing performed by the second information processing device based on the export data; and a processing unit configured to perform processing based on the result of the processing acquired by the import unit.

The present disclosure, in another aspect thereof, relates to an information processing system including a first information processing device and a second information processing device, wherein the first information processing device includes: an acquisition unit configured to acquire document data; an analysis processing unit configured to perform morphological analysis of the document data; a feature determining unit configured to determine a feature representing the document data based on a result of the morphological analysis and a hash function; an export unit configured to output export data that is data based on the feature to the second information processing device; an import unit configured to acquire a result of processing performed by the second information processing device based on the export data; and a processing unit configured to perform processing based on the result of the processing acquired by the import unit.

The present disclosure, in yet another aspect thereof, relates to an information processing method including an information processing device: acquiring document data; performing morphological analysis of the document data; determining a feature representing the document data based on a result of the morphological analysis and a hash function; exporting export data that is data based on the feature to the second information processing device; importing a result of processing performed by the second information processing device based on the export data; and performing processing based on the imported result of the processing.

BRIEF DESCRIPTION OF THE DRAWINGS

FIG. 17A is an example of a metadata feature.

FIG. 17B is an illustration of calibration processing for a metadata feature based on a first norm.

FIG. 17C is an illustration of calibration processing for a metadata feature based on a second norm.

DETAILED DESCRIPTION OF THE INVENTION

Figure 1:
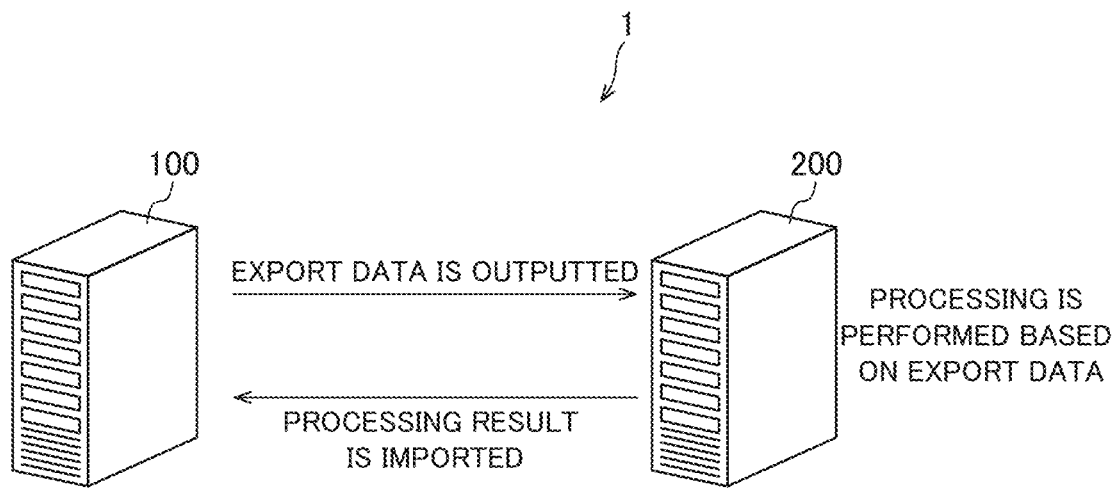
FIG. 1 is an exemplary configuration of an information processing system including an information processing device.

The following will describe the present embodiment with reference to drawings. Identical and equivalent elements in the drawings are denoted by the same reference numerals, and description thereof is not repeated. The scope of the present invention is not unreasonably limited by the present embodiment described below. Not all the members described in the present embodiment are essential to the present disclosure.

1. System Configuration

FIG. 1 is a diagram showing an exemplary configuration of an information processing system 1 including a first information processing device 100 that is an information processing device in accordance with the present embodiment. The information processing system 1 includes the first information processing device 100 and a second information processing device 200. Note that the configuration of the information processing system 1 is not limited to the configuration shown in FIG. 1 and may be modified in various manners including omission of a portion of the configuration or addition of another configuration.

The first information processing device 100 is a device for acquiring document data. In this context, the document data includes various text-related information. As an example, the document data may include emails, data written using a chat tool, data posted on an SNS (social networking service), data prepared using a document generation application, and various other data. The document data may additionally include, for example, data acquired as a result of performing speech recognition processing on audio data and data obtained by performing OCR processing on a result of reading out, for example, a handwritten document or a ledger sheet.

The second information processing device 200 differs from the first information processing device 100 and performs processing based on the document data. For example, the second information processing device 200 generates a learned model for use in document data processing through machine learning based on document data for training. Alternatively, it may be the first information processing device 100 that performs the machine learning for the generation of a learned model, whereas the second information processing device 200 may perform analysis processing related to this machine learning. Note that as will be described later, the processing based on document data in this context may be processing performed using hashed document data (feature, which will be described later).

In the present embodiment, the processing performed on document data by using a learned model may be, for example, classification processing. Classification processing may, for example, be processing of obtaining a degree of relevance between a prescribed event and target document data. The prescribed event in this context may vary. For example, the information processing system 1 in accordance with the present embodiment may be included in a discovery support system described below or other various systems, and the prescribed event may be any one or more of various events described below. It should be understood however that the prescribed event is not necessarily limited to the events listed below.

A case required for discovery proceedings on a discovery support system.
A crime that is subject to investigation on a criminal investigation support (forensics) system.
A fraudulent practice found on an e-mail monitoring system (e.g., information leakage and bid rigging).
An example and an event related to pharmaceuticals and found on a medical application system.
An example and an event on risks and opportunities in Economic Security Assistance system
An example and an event related to the Internet and found on an Internet application system.
A project conducted in the past on a project evaluation system.
A commodity and a service targeted for marketing on a marketing support system.
An intellectual property to be evaluated on an intellectual property evaluation system.
A fraudulent financial transaction found on a fraudulent transaction surveillance system.
An example of a past response made on a call center escalation system.
A target of credit check on a credit check system.
An issue related to vehicle operation on a driving support system.
Sales results found on a sales support system.

As shown above in relation to the medical application system, the information processing system 1 in accordance with the present embodiment may perform processing related to medical and nursing, nursing care information, and personal information. For example, the information processing system 1 may evaluate the degree of relevance between, for example, a patient and a disease, nursing, medication, and nursing care by performing processing that uses document data including the patient's electronic medical records as input data. The evaluation in this context may estimate a disease that the patient may be suffering from or estimate the medical and nursing care that is required by the patient. Alternatively, when a problem has occurred in a patient, the evaluation may estimate, for example, the medical and nursing care, the patient's attributes, and the patient's environment that could be a factor of the problem. Specific examples of the processing related to medical and nursing care and nursing care information may further vary and modified in various manners.

In addition, the processing performed on document data in the present embodiment is not necessarily limited to classification processing. For example, in the present embodiment, the learned model may be a model for performing clustering processing on document data. Alternatively, the learned model may perform keyword extraction processing of extracting a keyword from document data on the basis of given extraction conditions (search parameter). As another alternative, the learned model may be a model for performing summarization processing of summarizing document data into relatively short contents. Additionally, the processing performed on document data in the present embodiment may be modified in various manners.

The first information processing device 100 may be provided in the form of, for example, a server system. The server system in this context may be a single server or include a plurality of servers. For example, the server system may include a database server and an application server. The database server stores various data including document data and features (detailed later). The application server performs the processing described later with reference to, for example, FIG. 4. Note that the plurality of servers in this context may be physical servers or virtual servers. In addition, when a virtual server is used, this virtual server may be provided in a single physical server or in a plurality of physical servers in a distributed manner. The specific configuration of the server system in the present embodiment may be modified in various manners as described here. In other words, the first information processing device 100 in accordance with the present embodiment may be provided by a single device or by processing distributed across a plurality of devices. In addition, the first information processing device 100 is not necessarily limited to a server system and may be provided by a PC (personal computer) or like apparatus.

In addition, the second information processing device 200 may be provided in the form of a server system, a PC, or like apparatus. When the second information processing device 200 is provided in the form of a server system, the specific configuration thereof may be modified in various manners, similarly to the first information processing device 100.

The first information processing device 100 and the second information processing device 200 are connected together over, for example, a network. The network in this context is, for example, the Internet or a like public communications network. The network may however be, for example, a LAN (local area network) and is not limited in specific configuration.

Figure 2:
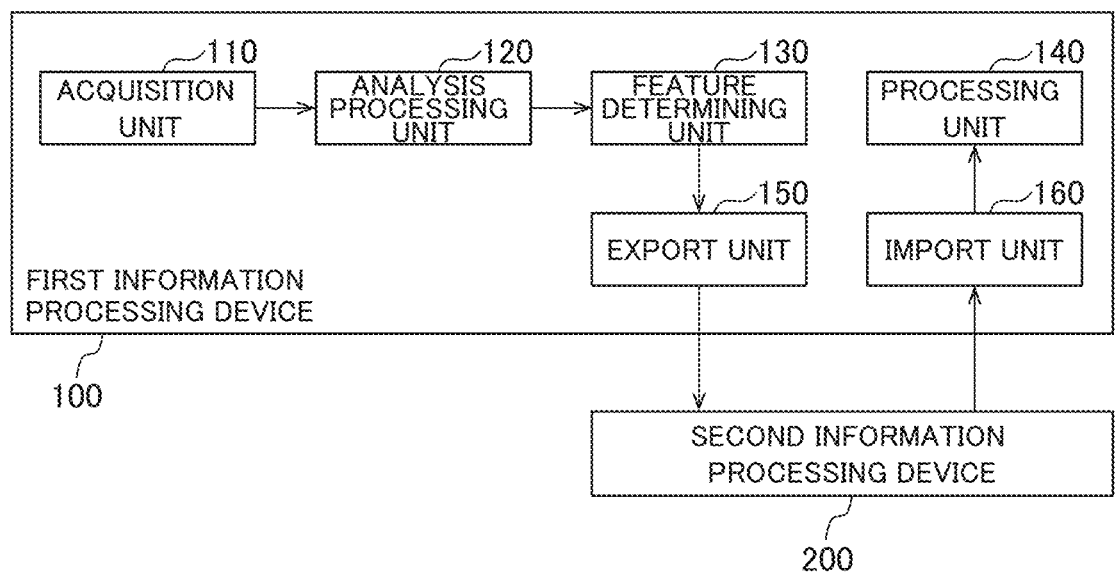
FIG. 2 is an exemplary configuration of a first information processing device.

FIG. 2 is a diagram showing an exemplary configuration of the first information processing device 100. The first information processing device 100 includes an acquisition unit 110, an analysis processing unit 120, a feature determining unit 130, a processing unit 140, an export unit 150, and an import unit 160. Note that the configuration of the first information processing device 100 is not limited to the configuration shown in FIG. 2 and may be modified in various manners including omission of a portion of the configuration or addition of another configuration.

The acquisition unit 110 acquires document data. As described above, the document data may include various data, and the acquisition unit 110 may acquire document data from various devices and applications. The acquisition unit 110 may be provided in the form of a communications interface for communications with a device that is a source of document data or in the form of a processor for controlling the communications. The communications interface in this context may be an interface for communications under, for example, IEEE 802.11 or IEEE802.3 or an interface for communications under another protocol. The communications interface may include, for example, an antenna, an RF (radio frequency) circuit, or a baseband circuit.

The analysis processing unit 120 acquires document data from the acquisition unit 110 to perform morphological analysis of the document data. The morphological analysis is a method widely used in the field of natural language processing, and for this reason, a detailed description of the analysis is omitted here. The morphological analysis extracts, from a single set of document data, a plurality of morphemes included in the set of document data.

The feature determining unit 130 determines a document data-based feature on the basis of results of the morphological analysis. The feature determining unit 130 may obtain the feature using a hash function. For example, the feature may be data in which each morpheme is hashed without changing word order information or may include no word order information as detailed later with reference to FIGS. 5 to 7. The feature will be described later in detail.

The export unit 150 outputs export data to an external device. The export data is data based on a feature to which a hash function has been already applied. The export data may be a feature per se or information obtained on the basis of a feature (e.g., a learned model or a search parameter detailed later). For example, the first information processing device 100 may include an export data determining unit (not shown) for determining what data is to be outputted as the export data. The export unit 150 outputs, as the export data, the data determined by the export data determining unit to an external device. The external device in this context is not the first information processing device 100, but the second information processing device 200 as an example. The second information processing device 200 performs processing based on the export data to acquire results of the processing. The import unit 160 acquires the results of the processing performed by the second information processing device 200.

The export unit 150 and the import unit 160 may be, for example, a communications interface with the second information processing device 200 or a processor for controlling the communications interface. The communications interface in this context may use a communications scheme in accordance with IEEE 802.11, a communications scheme in accordance with IEEE 802.3, or any other communications scheme.

The processing unit 140 performs processing based on the results of the processing performed by the second information processing device 200 that are acquired by the import unit 160. The processing in this context may be processing of outputting (e.g., processing of displaying) the results of the processing acquired or may be any other processing. The processing performed by the processing unit 140 will be described later in detail.

The first information processing device 100 in accordance with the present embodiment includes the following hardware as its components. The hardware may include either one or both of a digital signal processing circuit and an analog signal processing circuit. For example, the hardware includes one or more circuit devices or elements mounted to a circuit board. The one or more circuit devices may be, for example, an IC (integrated circuit) or an FPGA (field-programmable gate array). The one or more circuit elements may be, for example, a resistor or a capacitor. Note that the components of the first information processing device 100 are, for example, the acquisition unit 110, the analysis processing unit 120, the feature determining unit 130, and the processing unit 140, but may include the export unit 150 and the import unit 160.

In addition, the components of the first information processing device 100 may be provided by a processor described below. The first information processing device 100 in accordance with the present embodiment includes a memory for storing information and a processor that operates on the basis of the information stored in the memory. The information is, for example, programs and various data. The programs may include those which cause the first information processing device 100 to perform the processing described in the present specification. The processor includes hardware. The processor may be a CPU (central processing unit), a GPU (graphics processing unit), a DSP (digital signal processor), or any other like processor. The memory may be a semiconductor memory such as a SRAM (static random access memory), a DRAM (dynamic random access memory), or a flash memory; a register; a magnetic storage device such as hard disk drive (HDD); or an optical storage device such as an optical disc device. For example, the memory contains instructions that can be read out by the computer so that the processor can execute these instructions to provide the functions of the components of the first information processing device 100 in the form of processing. The instructions in this context may be a set of instructions that are part of a program or instructions for instructing the hardware circuitry of the processor for actions.

Figure 3:
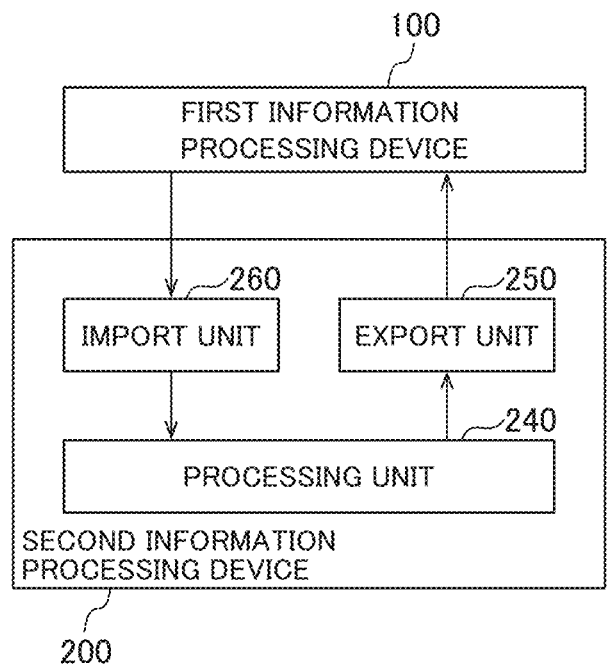
FIG. 3 is an exemplary configuration of a second information processing device.

FIG. 3 is a diagram showing an exemplary configuration of the second information processing device 200. The second information processing device 200 includes a processing unit 240, an export unit 250, and an import unit 260. Note that the configuration of the second information processing device 200 is not limited to the configuration shown in FIG. 3 and may be modified in various manners including omission of a portion of the configuration or addition of another configuration.

The import unit 260 acquires the export data outputted by the first information processing device 100.

The processing unit 240 performs processing based on the export data acquired by the import unit 260. For example, the processing unit 240 may acquire a feature as the export data and perform machine learning (learning processing) using the acquired feature as learning data. It should be understood however that the export data is not necessarily limited to a feature, and the processing performed by the processing unit 240 based on the export data is not necessarily limited to learning processing either. The processing performed by the processing unit 240 will be described later in detail.

The export unit 250 outputs results of the processing performed by the processing unit 240 to the first information processing device 100. The export unit 250 and the import unit 260 may be, for example, a communications interface with the first information processing device 100 or a processor for controlling the communications interface. The communications interface in this context may use a communications scheme in accordance with IEEE 802.11, a communications scheme in accordance with IEEE 802.3, or any other communications scheme.

The second information processing device 200 includes, as its components, hardware including either one or both of a digital signal processing circuit and an analog signal processing circuit. For example, the hardware includes one or more circuit devices or elements mounted to a circuit board.

Additionally, the second information processing device 200 may include a processor and a memory. The components of the second information processing device 200 may be provided by a processor including hardware, and the processor may be a CPU, a GPU, a DSP, or any other like processor. The memory may be a semiconductor memory, a register, a magnetic storage device, or an optical storage device. For example, the memory contains instructions that can be read out by the computer so that the processor can execute these instructions to provide the functions of the components of the second information processing device 200 in the form of processing.

The concerted operations of the first information processing device 100 and the second information processing device 200 are enabled by the second information processing device 200 performs processing using the export data obtained based on the document data acquired by the first information processing device 100 as described in the foregoing. For example, the information processing system 1 in accordance with the present embodiment is applicable to the above-described discovery support system and other various systems, and these systems may be provided by combining the first information processing device 100 with the second information processing device 200.

The document data in accordance with the present embodiment however could possibly contain information that one does not want to be leaked outside. For example, when the first information processing device 100 acquires, as the document data, email or business related data generated in business activities of a given company, this document data is confidential information that one does not want to be leaked outside the company. Alternatively, when the system is used in processing the document data obtained by dictating conversations between an employee and a client, the document data may contain speech by a person outside the company (client). The document data is preferably managed as confidential information in such a case. For example, when the second information processing device 200 belongs to an external company, the confidential information may leak out when the document data per se is transmitted to the second information processing device 200.

Accordingly, the first information processing device 100, which is an information processing device in accordance with the present embodiment, includes the acquisition unit 110, the analysis processing unit 120, the feature determining unit 130, the export unit 150, the import unit 160, and the processing unit 140 as described above. The feature determining unit 130 determines a feature on the basis of a hash function. The export unit 150 outputs the export data, which is data based on a feature, to the second information processing device 200.

The technique in accordance with the present embodiment enables transmitting, as the export data, not the original document data per se, but, for example, a hashed feature or data generated from this feature when the first information processing device 100 transmits data to the second information processing device 200. Since the hash function performs an irreversible (undecodable) conversion, the transmission of the export data to an external device does not result in confidential information being leaked. The technique hence restricts leaks of confidential information and still enables performing various processing based on the document data through concerted operations of a plurality of devices.

In addition, the technique in accordance with the present embodiment is applicable to the information processing system 1 including the first information processing device 100 and the second information processing device 200. The technique in accordance with the present embodiment restricts leaks of confidential information and still enables suitable concerted operations of a plurality of devices, even if the second information processing device 200 is not a secure environment to the first information processing device 100.

In addition, the technique in accordance with the present embodiment is applicable to an information processing method in which an information processing device (first information processing device 100) performs the following steps. The information processing method involves steps of the information processing device: acquiring document data; performing morphological analysis of the document data; determining a feature representing the document data on the basis of a result of the morphological analysis and a hash function; exporting export data generated based on the feature to the second information processing device 200; importing a result of the processing performed on the export data by the second information processing device 200; and performing processing based on the imported result.

2. Detailed Description of Processing

Figure 4:
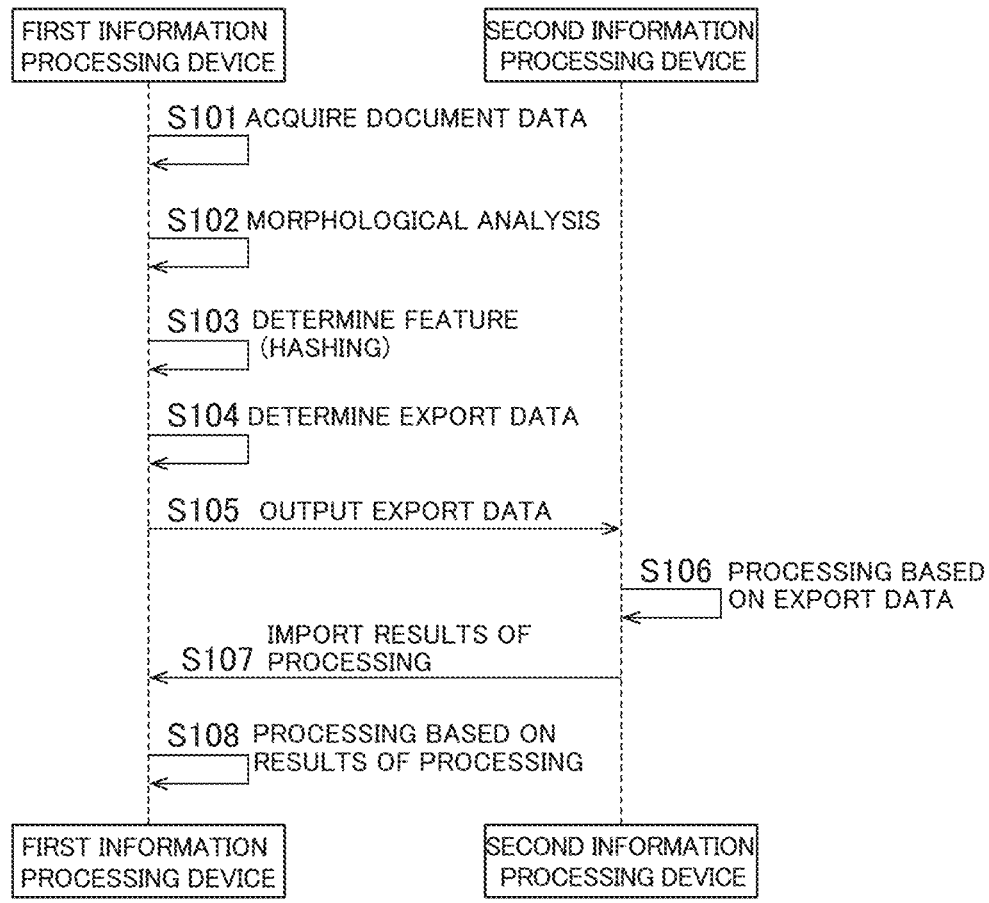
FIG. 4 is a sequence diagram representing processing in accordance with the present embodiment.

A detailed description is now given of the processing performed by the information processing system 1.
2.1 Processing Flow
FIG. 4 is a sequence diagram representing processing flow in the present embodiment. At the start of this processing, first, in step S101, the acquisition unit 110 in the first information processing device 100 acquires document data.

As described above, an email may be received, SNS posting data may be acquired, or another action may be taken, in step S101.

In step S102, the analysis processing unit 120 performs morphological analysis processing on the acquired document data. A morpheme in this context is a minimum linguistically meaningful unit of a sentence. The morphological analysis includes processing of dividing document data into a plurality of morphemes. The analysis processing unit 120 acquires a set of morphemes contained in this document data as a result of the morphological analysis. Note that the analysis processing unit 120 may determine, for example, the part of speech of the morpheme so that the result of morphological analysis can contain a result of the determination. The morphological analysis is a method widely used in the field of natural language processing, and for this reason, a detailed description of the analysis is omitted here.

In step S103, the feature determining unit 130 determines a feature corresponding to the document data. For example, the feature determining unit 130 may perform processing of determining a value that corresponds to a given morpheme on the basis of the occurrence of the given morpheme in the target document data. Then, the feature determining unit 130 may designate a tensor (in a narrow sense of the term, a vector) containing an array of values each obtained for a morpheme as the feature representing the target document data.

Figures 5, 6:
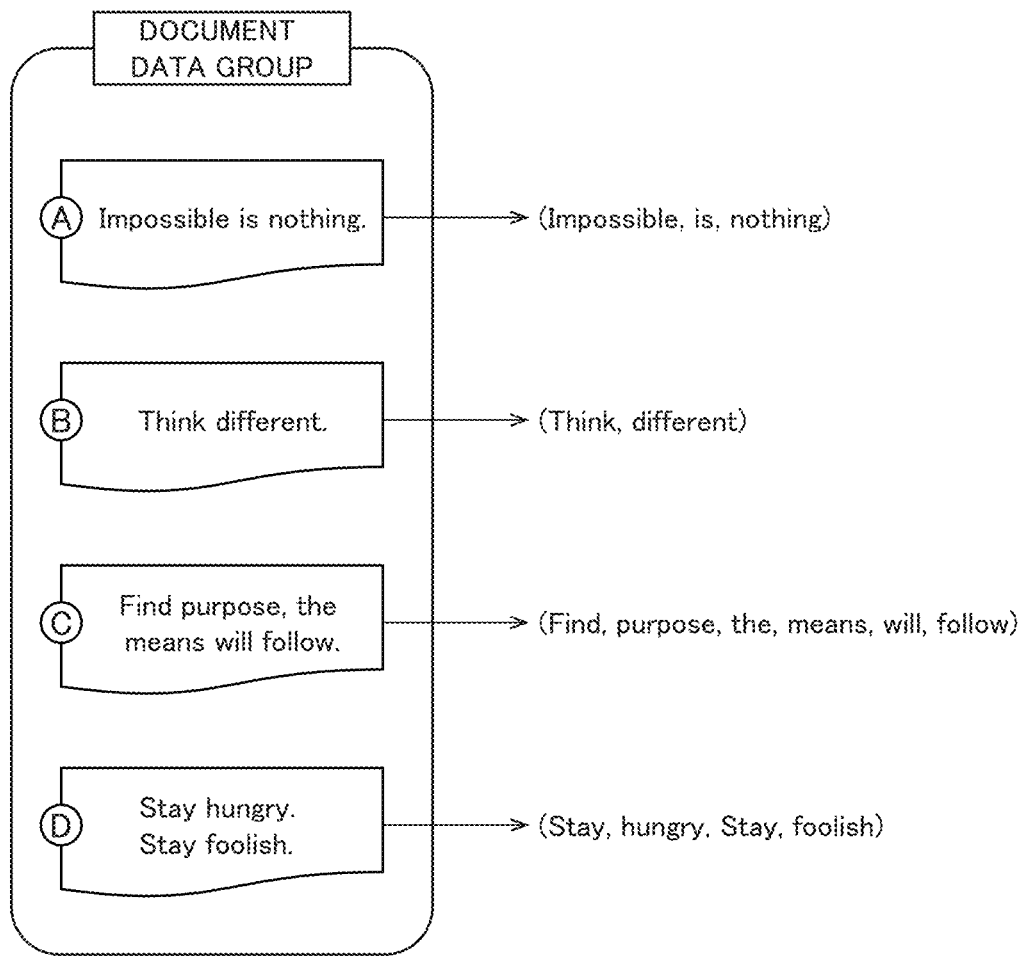
FIG. 5 is exemplary document data.
FIG. 6 is an exemplary configuration of a feature (vector) obtained by hashing document data.
Figures 7, 8:
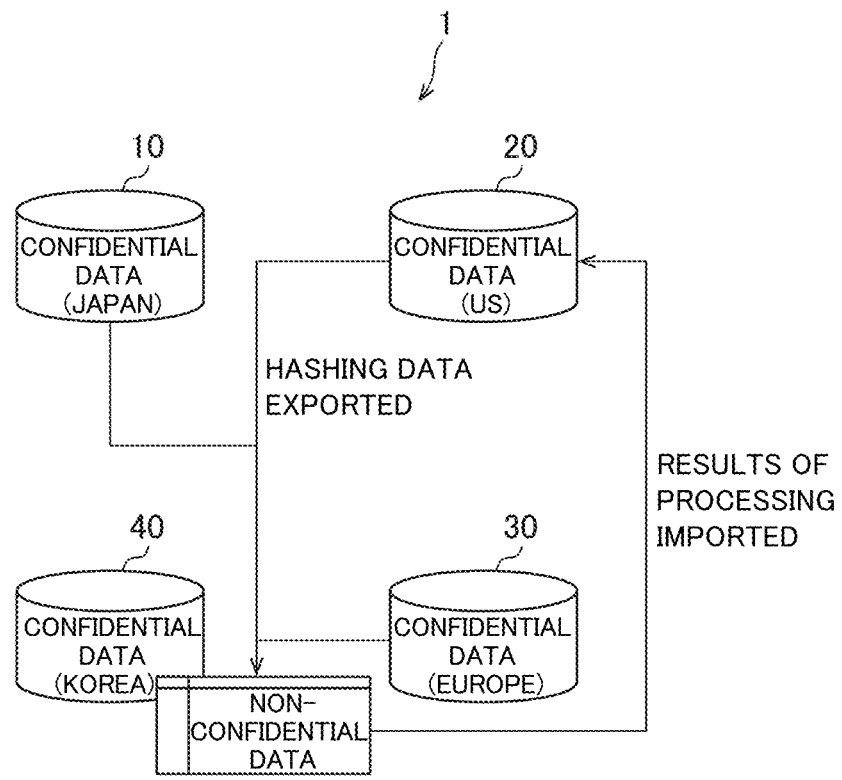
FIG. 7 is an exemplary relationship between document data and a feature.
FIG. 8 is a specific, exemplary configuration of the information processing system.

FIGS. 5 to 7 are diagrams representing processing of obtaining a feature on the basis of the result of the morphological analysis and a hash function. FIG. 5 shows simple examples of document data and results of morphological analysis. For example, suppose that the document data contains four documents: document data A to document data D. For example, document data A contains one sentence, "Impossible is nothing." In this case, three morphemes are acquired as a result of morphological analysis ("Impossible," "is," and "nothing"). This description equally applies to document data B to document data D.

In this case, an example is possible where the feature is obtained by designating the number of morphemes as an element and assigning the number of occurrences to the value of each element. For example, the feature of document data A is a vector with three elements corresponding to "Impossible," "is," and "nothing," with each element having a value of 1, which is the number of occurrences of the respective morpheme. Note, in this case, that, for example, the number of elements in the vector, which is the feature, and the morpheme corresponding to each element differ from one set of document data to the other because document data A to document data D contain morphemes of different types in different numbers.

Accordingly, a technique is used of associating each morpheme to one of N elements (N is an integer greater than or equal to 2) by specifying an N-sized tensor and applying a hash function to each morpheme. FIG. 6 shows an example of a tensor in such a case. The following will discuss an example where a vector, which is a tensor the rank of which is 1, is used as the tensor. Alternatively, the tensor in the present embodiment may be a matrix or a tensor the rank of which is 3 or greater. The tensor size is 13203 in the example of FIG. 6. For example, the feature determining unit 130 associates each morpheme to one of elements of the tensor using a hash function that produces an output size (output range) of 1 to 13203, both inclusive. In the example of FIG. 6, applying the hash function to "Impossible" produces a result of 1, and the morpheme, "Impossible," hence corresponds to the first element of the tensor. An example is now discussed where similarly, the morpheme, "is," corresponds to the second element of the tensor, and the morpheme, "nothing," corresponds to the third element of the tensor.

FIG. 7 is a diagram representing the feature obtained by converting the document data shown in FIG. 5 by the rules shown in FIG. 6. For example, since document data A contains "Impossible," "is," and "nothing," one each, as the morphemes, the feature determining unit 130 determines, as the feature of document data A, a tensor containing the first to third elements each equal to 1 and the other elements all equal to 0. This description equally applies to document data B to document data D. Given only the feature acquired here, it is impossible to obtain a relationship where the first element corresponds to "Impossible," and the second element corresponds to "is." Therefore, it is impossible to reconstruct the original document data from the feature obtained by the feature determining unit 130, and this feature can be treated as non-confidential information. Furthermore, since all the document data has a common tensor size, it is possible to achieve parallelization and commonization of processing and consequently to execute the processing at high speed. The parallelization of processing will be described later.

Note that applying a hash function to two different morphemes could produce the same result (collision) by chance. When such a collision happens, these two morphemes are undistinguishable, which would compromise processing precision. Therefore, the hash function may have an output size N that is equal to a value sufficiently greater than the expected number of morphemes (e.g., by a few tens of times greater to a few hundreds of times greater).

FIGS. 5 to 7 show an example where the obtained feature does not contain word order information as a result of processing focusing on the number of occurrences of each morpheme. For example, in document data A, "Impossible," "is," and "nothing" occur in this order (FIG. 5). This feature of document data A remains the same (FIG. 7) as long as "Impossible," "is," and "nothing" each occur once in the document data even if the order changes. The feature in accordance with the present embodiment however is not necessarily limited to this example and may contain word order information. For example, the feature determining unit 130 may obtain, as the feature, information in which results of applying a hash function to morphemes (FIG. 6) are arranged in the order of the occurrence of the morphemes. In addition, the feature in accordance with the present embodiment can be expanded to encompass other, various information obtained by using results of morphological analysis and a hash function.

Referring back to FIG. 4, a further description is given. After the feature is obtained, in step S104, the export data determining unit determines the data to be outputted as the export data. For example, the memory unit (not shown) in the first information processing device 100 may contain a plurality of candidates for the export data. The export data determining unit may determine, as the export data, any of the plurality of candidates on the basis of, for example, a user input.

In step S105, the export unit 150 exports the export data based on the feature to the second information processing device 200. The import unit 260 in the second information processing device 200 imports the export data from the first information processing device 100.

In step S106, the processing unit 240 in the second information processing device 200 performs processing on the basis of the export data. Details of the processing will be described later with reference to FIGS. 8 to 14.

In step S107, the export unit 250 in the second information processing device 200 exports results of the processing to the first information processing device 100. The import unit 160 in the first information processing device 100 imports the results of the processing.

In step S108, the processing unit 140 in the first information processing device 100 performs processing based on the results of the processing.

FIG. 8 is a diagram representing a specific, exemplary configuration of the information processing system 1. A description is now given of an example where the above-described processing flow being applied to the information processing system 1 shown in FIG. 8.

Referring to FIG. 8, the information processing system 1 may include, for example, a Japanese server 10 located in Japan, a US server 20 located in the US, a European server 30 located in Europe, and a Korean server 40 located in Korea.

The Japanese server 10 stores document data acquired in Japan (equivalent of step S101 in FIG. 4). This document data is treated as confidential information as described earlier. Likewise, the US server 20 stores document data that is confidential information acquired in the US. The European server 30 stores document data that is confidential information acquired in Europe. The Korean server 40 stores document data that is confidential information acquired in Korea. Note that throughout the following description, the document data that is yet to be hashed may be referred to as raw data (raw document data). Raw data is confidential information and, in the example of FIG. 8, represents the document data acquired inside each country or region.

At this stage, each server may expand the processing targets to include another country by acquiring document data of that country. For example, when a given company has its headquarters in Korea and branches in Japan, the US, and Europe, the Korean server 40 acquires data from the Japanese server 10, the US server 20, and the European server 30 as shown in FIG. 8. Hence, the Korean server 40 is enabled to perform processing on an aggregate of document data of each country.

However, as described above, the Japanese server 10 does not transmit raw document data per se, but transmits export data to the Korean server 40 (equivalent of steps S102 to S105 in FIG. 4). Here, an example is described where the export data is a feature per se that is hashed document data. Since the feature is hashed data, the feature, unlike raw data, is non-confidential data. This description equally applies to the US server 20 and the European server 30. Therefore, the confidential information acquired in each country is restrained from being leaked outside the country.

Note that the server in each country may attach an ID that uniquely represents the original document data to each feature in transmitting the export data to the Korean server 40. This configuration enables the Korean server 40 to identify correspondence between the feature and the document data. In addition, the information attached to the feature is not necessarily limited to an ID. For example, the Korean server 40 may associate, for example, a document data ID, the country in which the document data is acquired, and the date and time at which the document data is acquired to each feature in managing the feature. Regarding this metadata, Korean document data is acquired by the Korean server 40, and other countries' document data is transmitted from the server in each country to the Korean server 40.

In addition, the Korean server 40 performs processing based on the collected information (equivalent of step S106 in FIG. 4) and transmits a result of the processing to the server in each country (equivalent of step S107). Hence, the Japanese server 10, the US server 20, and the European server 30 can also utilize the result of the processing.

For instance, suppose that litigation has occurred at the US branch of the company, and it has become necessary to submit materials for discovery proceedings. In such a case, for example, the Korean server 40 may prepare a discovery-supporting learned model in advance through machine learning based on document data of each country. Then, the Korean server 40 transmits to the US server 20 the information related to the document data determined to be relevant to the litigation on the basis of a result of classification using this learned model. This makes it possible to appropriately support discovery proceedings in the target company.

At this stage, the technique in accordance with the present embodiment can limit the data transmitted as a result of processing to only necessary data. In this example of discovery proceedings, the Korean server 40 needs only to transmit a part of a plurality of sets of document data that is particularly relevant to the litigation.

For instance, when the target data is Korean document data, the Korean server 40 performs processing of extracting document data that is relevant to the litigation from the raw document data acquired in Korea and transmits only the extracted document data to the US server 20. Alternatively, the Korean server 40 may transmit, to the US server 20, not the raw document data per se, but, for example, data obtained by converting this document data to an image or the metadata attached to this document data. Hence, the document data that is confidential information is restrained from unnecessarily being leaked outside the country. Note that in which country the document data relevant to the discovery was originally acquired is identified from, for example, the ID or the metadata.

In addition, when the target data is US document data, the Korean server 40 does not possess the raw data for this document data. Therefore, the Korean server 40 may transmit the ID for identifying the document data to the US server 20. Since the raw document data is stored in the US server 20, the US server 20 can identify the document data to be used in the discovery proceedings on the basis of the ID.

In addition, when the target document data is Japanese document data, the Korean server 40 may transmit, to the Japanese server 10, an instruction to transmit, to the US server 20, the ID for identifying the document data as well as the document data corresponding to this ID. The Japanese server 10 identifies the target document data on the basis of the ID and transmits the identified document data to the US server 20. Here, the information transmitted from the Japanese server 10 to the US server 20 may be raw data, information in which part of raw data has been converted to an image, or metadata attached to the raw data, as in the foregoing example. When the target document data is European document data, the Korean server 40 similarly transmits necessary data to the US server 20 via the European server 30.

In the example of FIG. 8, the US server 20, which exports the export data (feature) and imports a result of processing based on this export data, corresponds to the information processing device (first information processing device 100) in accordance with the present embodiment. In addition, the Korean server 40, which performs processing based on the export data acquired from the US server 20 and transmits a result of the processing to the US server 20, corresponds to the second information processing device 200.

Note that although the Japanese server 10 and the European server 30 are not recipients of the export data from the US server 20, the Japanese server 10 and the European server 30 may be included in the external device (the second information processing device 200) for the US server 20 because a result of processing by the Korean server 40 may be transmitted to the US server 20. In other words, the second information processing device 200 is not necessarily limited to a single device and may be provided in the form of a plurality of devices in a distributed manner.

2.2 Specific Example of Export Data

A description is given next of specific examples of each of the export data outputted from the first information processing device 100, the processing by the second information processing device 200 using this export data, and a result of the processing by the second information processing device 200.

Example 1

The second information processing device 200 may have acquired a learned model when the export data is outputted from the first information processing device 100. This learned model may be, for example, a model generated on the basis of the document data acquired by the second information processing device 200. In this case, the first information processing device 100 may export the feature per se obtained by the feature determining unit 130 as the target data for inference processing. The second information processing device 200 inputs the feature imported from the first information processing device 100 to an existing learned model and acquires an output of this model. The output of the model is, for example, a score representing the degree of relevance between document data and a given event, both corresponding to a feature. The import unit 160 in the first information processing device 100 may acquire this score as a result of processing.

Figure 9:
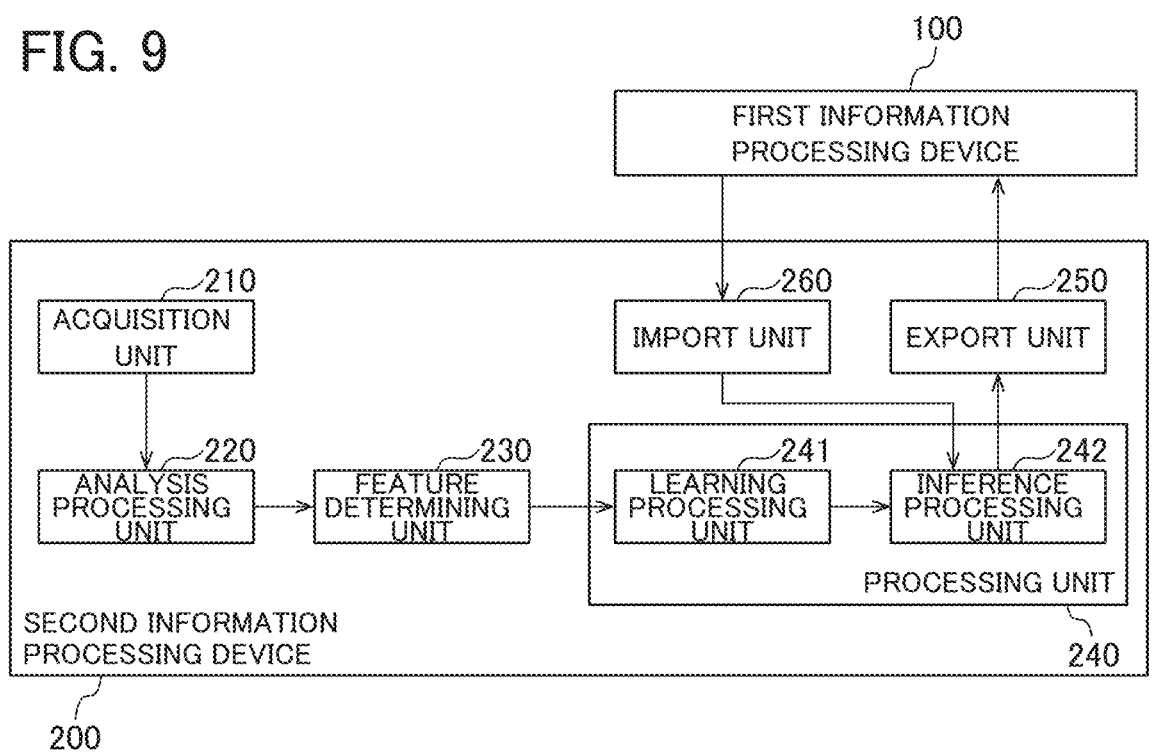
FIG. 9 is another exemplary configuration of the second information processing device.

FIG. 9 is a diagram representing an exemplary configuration of the information processing system 1 in this case and in particular, is a diagram representing another exemplary configuration of the second information processing device 200. Referring to FIG. 9, the second information processing device 200 may include an acquisition unit 210, an analysis processing unit 220, a feature determining unit 230, the processing unit 240, the export unit 250, and the import unit 260. The processing unit 240 may include a learning processing unit 241 and an inference processing unit 242.

The acquisition unit 210 acquires document data. The analysis processing unit 220 acquires the document data from the acquisition unit 210 and performs morphological analysis of this document data. The feature determining unit 230 determines a feature representing the document data on the basis of a result of the morphological analysis and a hash function. The acquisition unit 210, the analysis processing unit 220, and the feature determining unit 230 are the same as the acquisition unit 110, the analysis processing unit 120, and the feature determining unit 130 in the first information processing device 100.

The learning processing unit 241 performs machine learning for determining a weight in the model on the basis of the feature. The model in this context may be any one of various models including a linear model, a generalized linear model, a decision tree, and a random forest. Alternatively, the model may be a model generated by using a neural network and may be, for example, an RNN (recurrent neural network) or technique developed from these. The machine learning in this context is, for example, supervised learning, and the feature may be assigned with correct data. The correct data is, for example, a tag representing whether or not the document data is relevant to a given event. For example, the learning processing unit 241 performs processing of estimating a probable weight by using the feature as an explanatory variable and using the correct data as an objective variable. The learning processing unit 241 outputs a model with a determined weight as a learned model. It should be understood however that the learned model may involve clustering and in this case, the machine learning may be unsupervised learning.

The inference processing unit 242 performs inference processing using the learned model outputted by the learning processing unit 241. Specifically, the inference processing unit 242 may acquire a score for document data that is a target of the inference processing, by inputting the feature of this document data to the learned model.

For instance, the import unit 260 may acquire the feature of the document data that is a target of the inference processing as the export data. The inference processing unit 242 inputs this feature to the learned model. This configuration enables the inference processing unit 242 to perform processing using the learned model on the document data acquired by the first information processing device 100. Specifically, the inference processing unit 242 performs classification processing of obtaining, as information such as a score, the degree of relevance between the document data that is a target of the processing and a given event.

The import unit 160 in the first information processing device 100 imports, for example, the score obtained by the inference processing unit 242. The processing unit 140 in the first information processing device 100, for example, performs processing of displaying the score.

Figure 10:
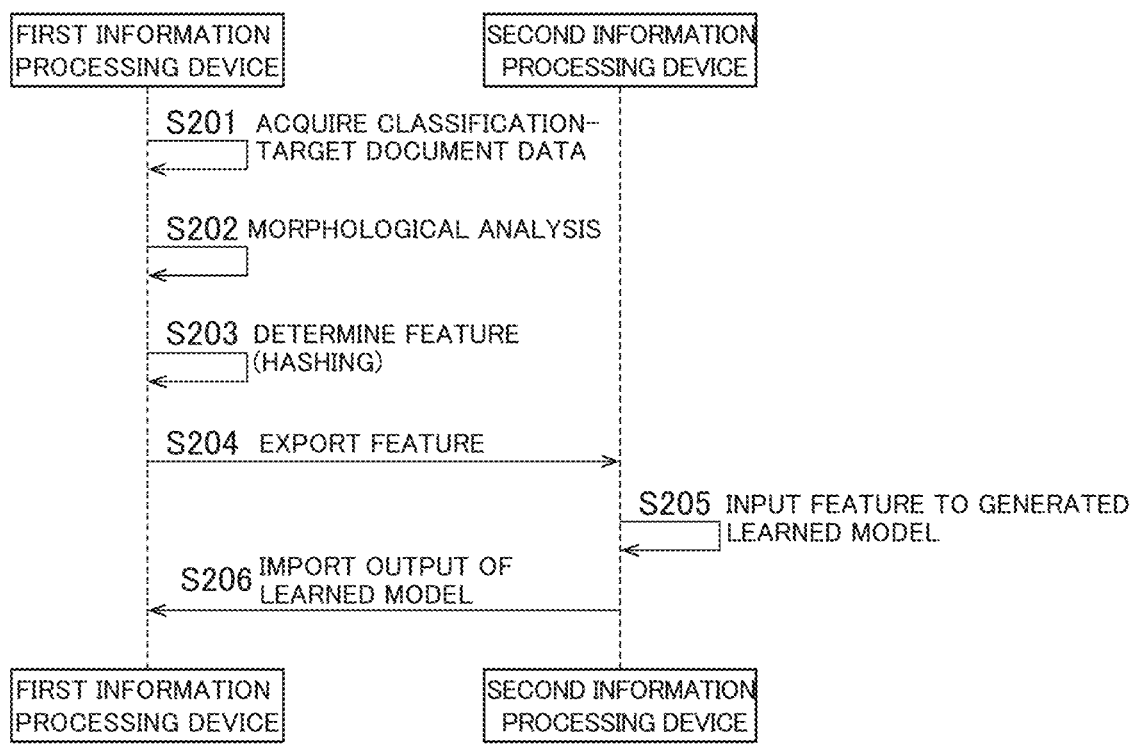
FIG. 10 is another sequence diagram representing the processing in accordance with the present embodiment.

FIG. 10 is a sequence diagram representing processing flow in this case. In step S201, the acquisition unit 110 in the first information processing device 100 acquires the document data that is a target of the inference processing (e.g., the classification processing). For example, the acquisition unit 110 may determine the document data that is a target of the classification processing on the basis of an input from the user of the first information processing device 100. Alternatively, the acquisition unit 110 may automatically select one or more sets of document data as the document data that is a target of the classification processing on the basis of, for example, the type of the document data, the author of the document data, and/or the date and time of generating the document data. For example, when the technique in accordance with the present embodiment is used in email auditing, the acquisition unit 110 in the first information processing device 100 may specify, as the document data that is a target of the classification processing, all the emails transmitted/received over a prescribed period of time by a person the email of whom is to be audited.

In step S202, the analysis processing unit 120 performs morphological analysis of the document data. In step S203, the feature determining unit 130 obtains the feature on the basis of a result of the morphological analysis and a hash function.

In step S204, the export unit 150 exports the feature to the second information processing device 200. Note that before step S204, the export data determining unit may perform processing of determining a feature as the export data.

In step S205, the inference processing unit 242 in the second information processing device 200 obtains an output of an existing learned model by inputting the feature transmitted from the first information processing device 100 to the model. The export unit 250 exports the model output to the first information processing device 100.

In step S206, the import unit 160 in the first information processing device 100 imports the learned model output for output to the processing unit 140. This configuration enables restraining confidential information from being leaked out when an external device performs processing related to the document data acquired by the first information processing device 100.

Note that the processing performed by the second information processing device 200 using a learned model is not necessarily limited to classification processing and may be, for example, clustering processing, keyword extraction processing, or summarization processing. For example, the learning processing unit 241 in the second information processing device 200 generates a learned model for clustering. The inference processing unit 242 performs clustering of document data by inputting the feature acquired by the import unit 260 to this learned model. Alternatively, the learning processing unit 241 generates a learned model for keyword extraction, and the inference processing unit 242 inputs the feature acquired by the import unit 260 to this learned model, to extract a keyword from the document data in accordance with given extraction conditions. The extraction conditions in this context may be, for example, a predetermined word and its similar words or other conditions. Alternatively, the learning processing unit 241 generates a learned model for summarization processing, and the inference processing unit 242 inputs the feature acquired by the import unit 260 to this learned model, to output summary document data prepared by summarizing the document data.

Example 2

The second information processing device 200 may use the feature exported from the first information processing device 100 in learning processing. In this case, the first information processing device 100 may export the feature as data for learning. The second information processing device 200 performs machine learning based on the feature imported from the first information processing device 100 to generate a learned model. The import unit 160 in the first information processing device 100 may acquire the generated learned model per se as a result of processing or acquire an output of the generated learned model as a result of processing.

Figure 11:
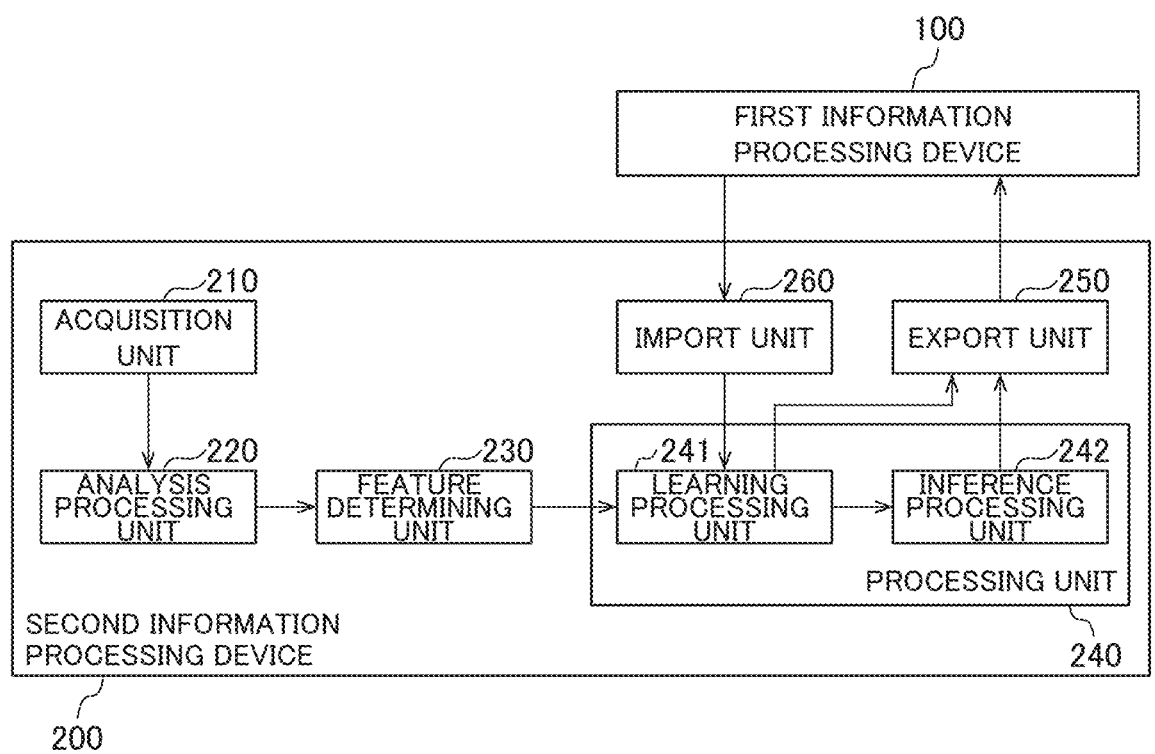
FIG. 11 is another exemplary configuration of the second information processing device.

FIG. 11 is a diagram representing an exemplary configuration of the information processing system 1 in this case and in particular, is a diagram representing another exemplary configuration of the second information processing device 200. The second information processing device 200 includes the acquisition unit 210, the analysis processing unit 220, the feature determining unit 230, the learning processing unit 241, the inference processing unit 242, the export unit 250, and the import unit 260, similarly to FIG. 9. The difference from FIG. 9 is that the feature acquired from the first information processing device 100 by the import unit 260 is inputted to the learning processing unit 241. In addition, when the second information processing device 200 does not acquire raw document data (when the second information processing device 200 acquires the learning data only from the outside), the acquisition unit 210, the analysis processing unit 220, and the feature determining unit 230 in FIG. 11 may be omitted.

Figure 12:
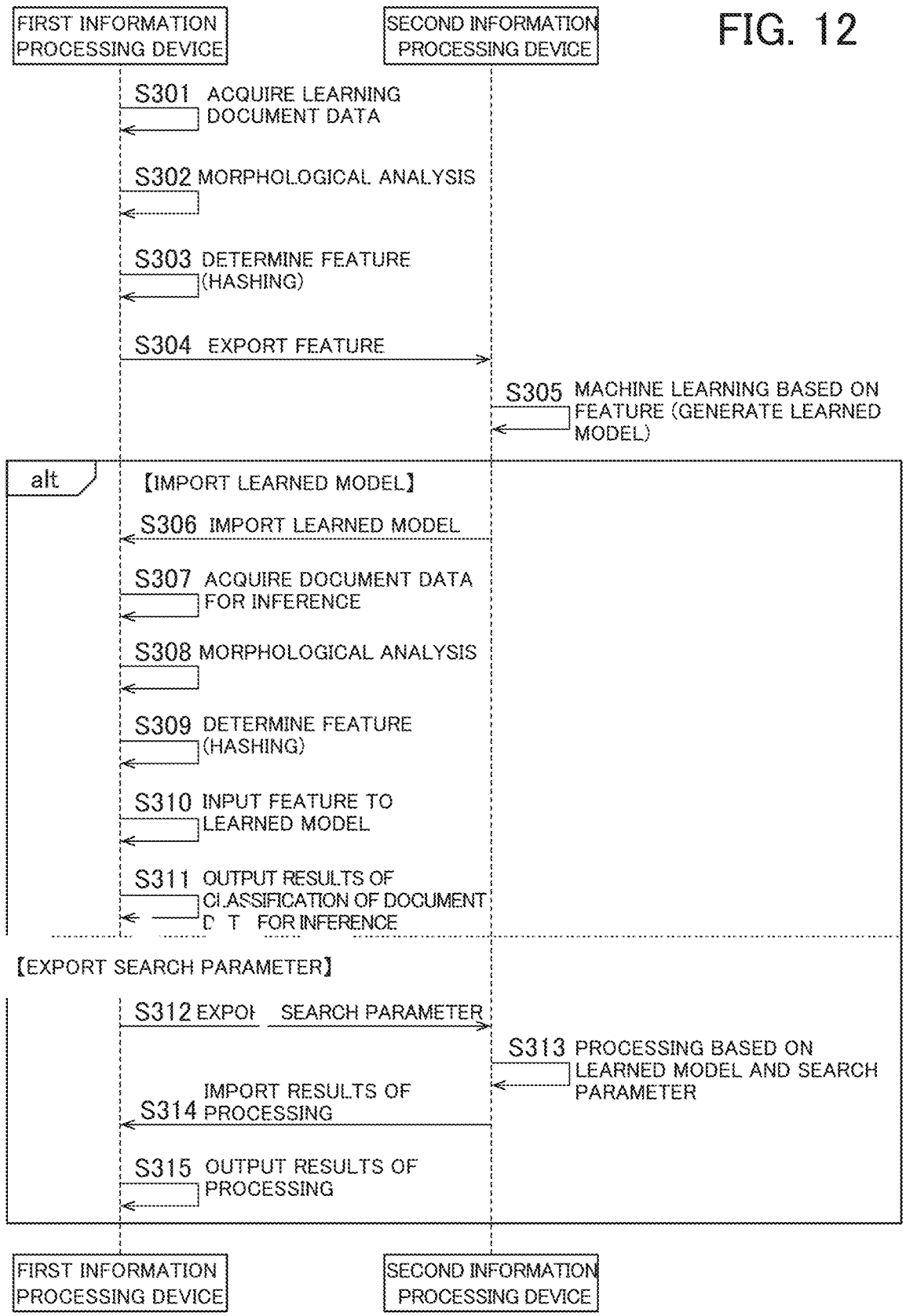
FIG. 12 is another sequence diagram representing the processing in accordance with the present embodiment.

FIG. 12 is a sequence diagram representing processing flow in this case. In step S301, the acquisition unit 110 in the first information processing device 100 acquires document data that is data for learning. For example, the acquisition unit 110 may perform annotation processing of associating correct data with document data. The annotation processing is performed by, for example, the user first checking the details of the document data and only then inputting whether or not the document data is relevant to a given event. Note that the annotation processing may be performed by a device other than the first information processing device 100. In addition, when unsupervised learning is performed, annotation is omitted.

In step S302, the analysis processing unit 120 performs morphological analysis of the document data. In step S303, the feature determining unit 130 obtains a feature on the basis of a result of the morphological analysis and a hash function. In step S304, the export unit 150 exports the feature as the export data to the second information processing device 200.

In step S305, the learning processing unit 241 in the second information processing device 200 generates a learned model by performing machine learning using the feature transmitted from the first information processing device 100 as at least part of the data for learning. In the present embodiment, the machine learning may be chosen from various publicly known techniques, and a detailed description is omitted.

When the second information processing device 200 generates a learned model through machine learning based on the feature as described here, the export unit 150 in the first information processing device 100 may output the feature as the export data, and the import unit 160 may acquire, as a result of processing, a learned model generated using this feature or information based on the learned model. This configuration enables the first information processing device 100 to equally perform processing using a result of machine learning.

For instance, the import unit 160 may acquire a learned model per se as a result of processing. This acquisition of a learned model per se enables the first information processing device 100 to perform inference processing using this learned model. For example, the processing unit 140 performs processing of document data by inputting the feature of the document data that is a target of the processing into a learned model. The processing performed by the first information processing device 100 using a learned model may be any of various processing including classification processing, clustering processing, keyword extraction processing, and summarization processing, similarly to the above-described example of the second information processing device 200.

Steps S306 to S311 in FIG. 12 are an equivalent of exemplary processing in a case where a learned model is imported. For example, in step S306, the import unit 160 in the first information processing device 100 imports the learned model generated by the learning processing unit 241. The imported learned model is stored in, for example, a memory unit (not shown) in the first information processing device 100.

In step S307, the acquisition unit 110 acquires document data for inference that is target document data for the inference processing. In step S308, the analysis processing unit 120 performs morphological analysis of the document data for inference. In step S309, the feature determining unit 130 obtains a feature on the basis of a result of the morphological analysis and a hash function.

In step S310, the processing unit 140 reads out a learned model from a memory unit (not shown) and inputs the feature obtained in step S309 to this learned model. In step S311, the processing unit 140 outputs a result of processing using the learned model. For example, as shown in FIG. 12, the processing unit 140 may perform classification processing on the document data and output a result of the processing. Specifically, when the learned model outputs a score representing a degree of relevance between document data and a given event, the processing unit 140, for example, performs processing of displaying of this score.

However, the import unit 160 does not necessarily import a learned model per se. For example, the import unit 160, after a learned model is generated on the basis of the feature exported by the first information processing device 100, may import a result of processing performed by the inference processing unit 242 in the second information processing device 200 on the basis of this learned model. For example, as described above with reference to FIGS. 9 and 10, the export unit 150 in the first information processing device 100 may export the feature of the document data that is a new target of the inference processing, and the import unit 160 may import a result of the processing based on this feature (e.g., a score representing a result of the classification processing).

Alternatively, the export unit 150 may output a search parameter generated on the basis of the feature as export data to the second information processing device 200. The technique in accordance with the present embodiment enables the first information processing device 100 to not only provide learning data, but also designate the content of search processing based on this learning data. Therefore, the second information processing device 200 is enabled to perform search processing in accordance with the intention of the user of the first information processing device 100.

The search parameter in this context is obtained through, for example, statistical processing on a plurality of sets of document data acquired by the first information processing device 100. For example, the search parameter may be information representing an attribute that is common to document data containing a prescribed morpheme. The prescribed morpheme in this context may be a morpheme designated by the user, a morpheme with a large value of tf-idf (term frequency-inverse document frequency), or a morpheme determined on other conditions. In addition, an attribute of document data may be determined from the metadata attached to the document data. For example, the type of the document data, the author of the document data, and the date and time of generating the document data may be used as an attribute. For example, the inference processing unit 242 in the second information processing device 200, after performing classification processing using a learned model, may output, as a result of the processing, the data that is determined to be relevant to a given event and that also has an attribute designated in a search parameter.

In addition, when the learned model outputs a score, the search parameter may be a threshold value used in processing of comparing with this score. For example, the inference processing unit 242 in the second information processing device 200 may obtain a score of inference-target document data using a learned model and output, as a result of the processing, the data the score of which exceeds the threshold value designated in the search parameter. For example, the memory unit in the first information processing device 100 may store a statistical amount such as the distribution range of a score for each set of metadata of the document data. This statistical amount is obtained on the basis of a result of past processing. The threshold value may be obtained on the basis of the metadata attached to processing-target document data and the statistical amount stored in the memory unit.

In addition, the search parameter may be information for instructing a change in a property of the learned model (e.g., weight determined in the learning processing). For example, the inference processing unit 242 in the second information processing device 200 may update the learned model on the basis of the search parameter and output a result of the processing using the updated learned model. The weight and the amount of change in the weight that are targets to be changed here, similarly to the example of the threshold value, may be obtained on the basis of the metadata attached to the processing-target document data and the past history (e.g., statistical amount) stored in the memory unit. Additionally, the search parameter and the processing using the search parameter may be modified in various manners.

Steps S312 to S315 in FIG. 12 are an equivalent of exemplary processing in a case where the search parameter is outputted. For example, in step S312, the export unit 150 in the first information processing device 100 outputs the search parameter and the feature of a document for inference as export data to the second information processing device 200. For example, the export data determining unit (not shown in FIG. 12) may perform processing of determining the search parameter on the basis of the feature.

In step S313, the processing unit 240 in the second information processing device 200 (in a narrow sense of the term, the inference processing unit 242) performs processing on the basis of the learned model and the search parameter. The export unit 250 in the second information processing device 200 exports a result of the processing to the first information processing device 100.

In step S314, the import unit 160 in the first information processing device 100 imports a result of the processing based on the learned model and the search parameter. In step S315, the processing unit 140 outputs the imported result of the processing.

Example 3

In addition, a learned model may be generated by the first information processing device 100 performing learning processing. In this case, the first information processing device 100 may export a feature as data used for analyzing the learned model. The second information processing device 200 performs analysis processing on the basis of the feature acquired from the first information processing device 100. The analysis processing in this context may include processing such as data assessment, label assessment, cleansing, supervised data adjustment, and AI model type selection. Note that these are techniques widely used in the field of machine learning, and a detailed description is omitted. The import unit 160 in the first information processing device 100 may acquire a result of the analysis by the second information processing device 200 as a result of the processing.

Figure 13:
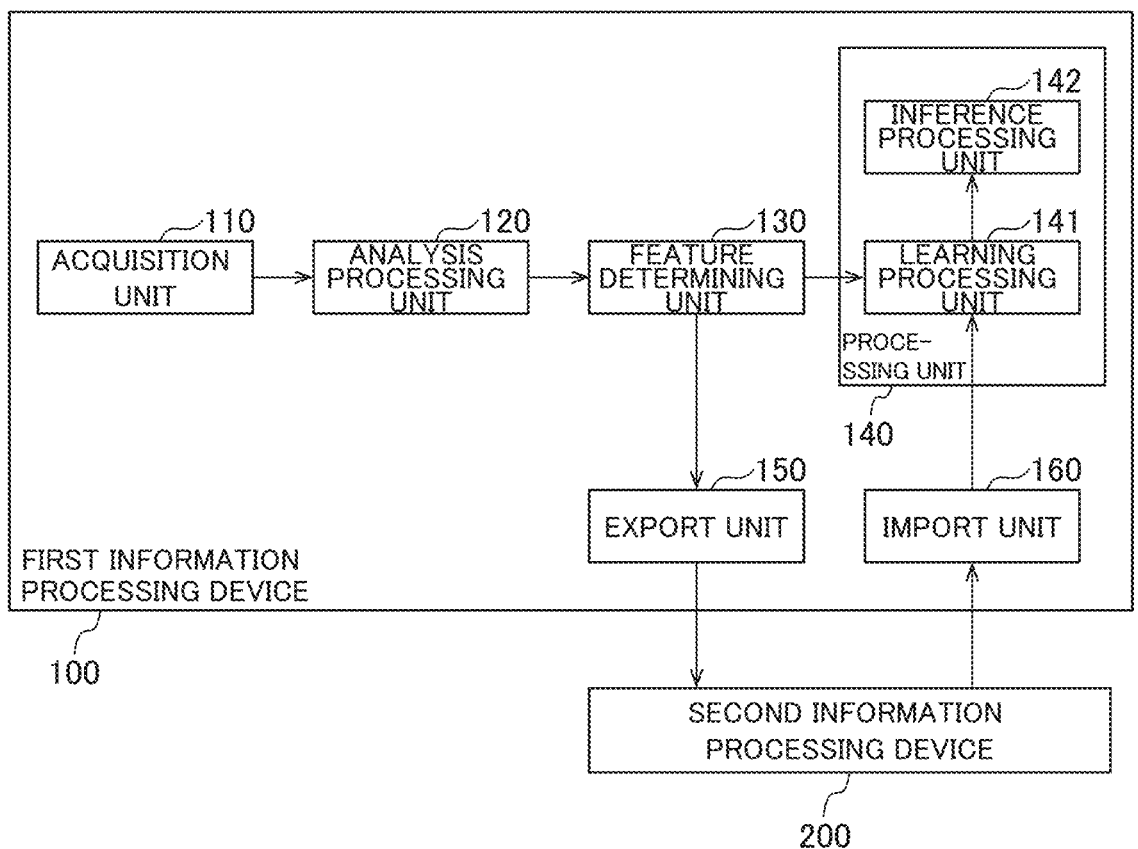
FIG. 13 is another exemplary configuration of the first information processing device.

FIG. 13 is a diagram representing an exemplary configuration of the information processing system 1 in this case and in particular, is a diagram representing another exemplary configuration of the first information processing device 100. Referring to FIG. 13, the first information processing device 100 includes the acquisition unit 110, the analysis processing unit 120, the feature determining unit 130, the processing unit 140, the export unit 150, and the import unit 160. The processing unit 140 may include a learning processing unit 141 and an inference processing unit 142.

The learning processing unit 141 performs machine learning for determining a weight in a model on the basis of the feature. The learning processing unit 141 outputs the model for which a weight has been determined as a learned model. The inference processing unit 142 performs inference processing using the learned model outputted by the learning processing unit 141.

Figure 14:
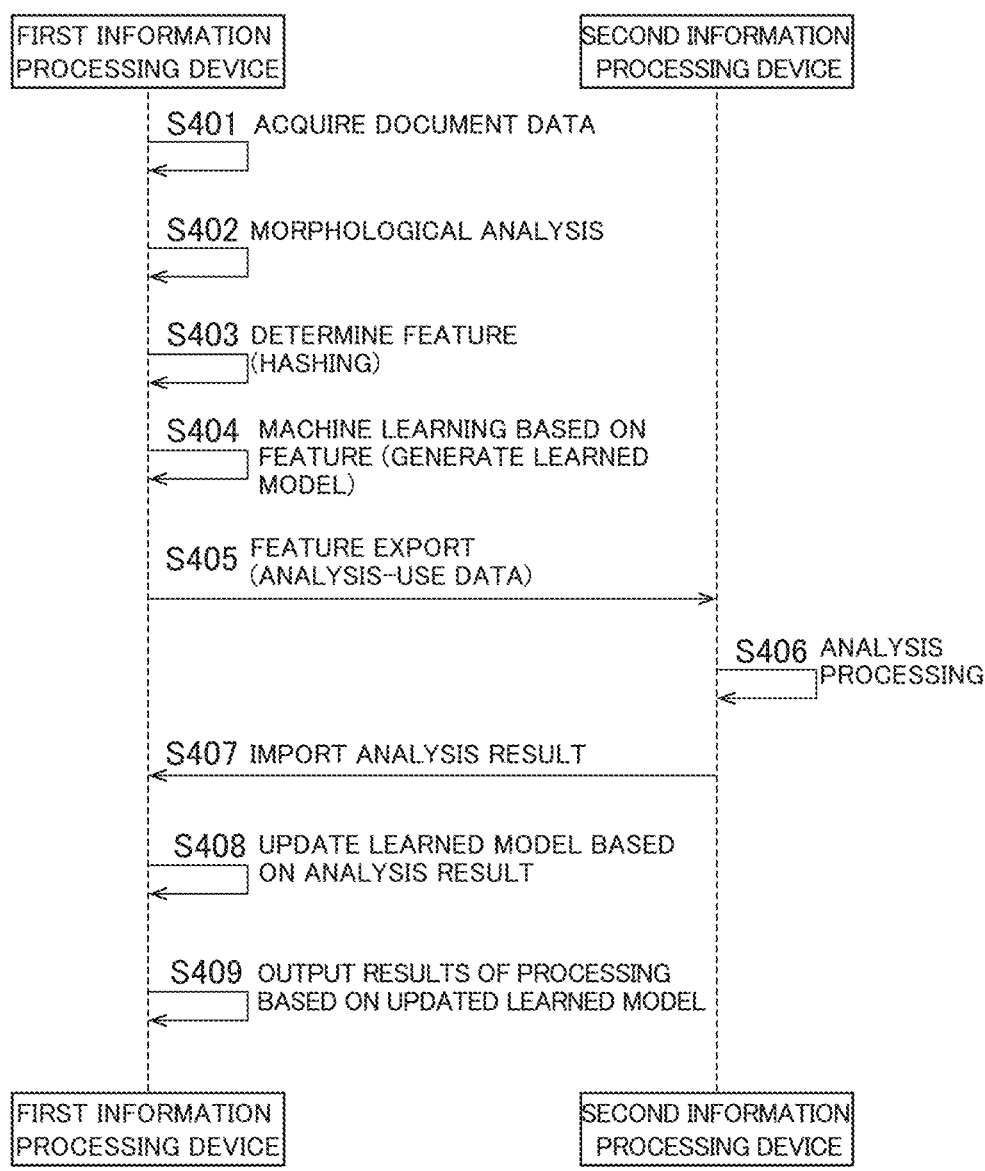
FIG. 14 is another sequence diagram representing the processing in accordance with the present embodiment.

FIG. 14 is a sequence diagram representing processing flow in this case. In step S401, the acquisition unit 110 in the first information processing device 100 acquires the document data that is data for learning. For example, the acquisition unit 110 may perform annotation processing of associating the document data with correct data.

In step S402, the analysis processing unit 120 performs morphological analysis of the document data. In step S403, the feature determining unit 130 obtains a feature on the basis of a result of the morphological analysis and a hash function. In step S404, the processing unit 140 (the learning processing unit 141) generates a learned model by performing machine learning on the basis of the feature.

In step S405, the export unit 150 outputs the feature as export data to the second information processing device 200. More specifically, the export unit 150 outputs the feature obtained by the feature determining unit 130 as data for analysis processing (for adjustment processing, for analysis processing). Note that the export data is not necessarily limited to the feature per se and may include, for example, statistical information and metadata of the feature.

In step S406, the processing unit 240 in the second information processing device 200 performs analysis processing based on this feature. Since the feature in this context is training data for machine learning, the second information processing device 200 can, for example, determine whether or not the machine learning has been performed on the basis of appropriate data and analyze, for example, the adjustment required when the data is inappropriate. The export unit 250 in the second information processing device 200 exports a result of the analysis processing to the first information processing device 100.

In step S407, the import unit 160 imports a result of the analysis processing. In step S408, the learning processing unit 141 updates the learned model on the basis of the result of the analysis processing. For example, the learning processing unit 141 may update, for example, the learning data and the model type on the basis of the result of the analysis processing and only then perform learning processing again.

In step S409, the inference processing unit 142 performs processing based on the updated learned model and outputs a result of the processing. Note that FIG. 14 shows an example where learning processing is performed (step S404) before exporting the feature (before step S405), but is not limited to this. The learned model needs only to be acquired before the update processing based on the result of the processing (step S408), and the learning processing and the export data output processing may be performed in reverse order or performed in a parallel manner.

As described in the foregoing, the processing unit 140 (the learning processing unit 141) in the first information processing device 100 may perform the learning processing for generating a learned model through machine learning based on the feature determined by the feature determining unit 130 (step S404) and the processing of updating the learned model on the basis of the result of the processing (step S408). Then, the import unit 160 acquires a result of the analysis processing based on the export data as a result of the processing (step S407).

The technique in accordance with the present embodiment, when the first information processing device 100 performs machine learning, enables the external device (the second information processing device 200) to perform the analysis related to this machine learning. At this stage, since the information provided to the second information processing device 200 is a feature, the confidential information is restrained from being leaked outside. For example, the user of the first information processing device 100 can, for example, use an external analysis application without allowing his/her confidential information to leak out.

In addition, when the second information processing device 200 performs analysis related to the machine learning, the export data outputted by the first information processing device 100 is not necessarily limited to the feature. For example, the export unit 150 may output the learned model generated by the processing unit 140 (learning processing unit 141) as export data. In this case, the second information processing device 200 can acquire analysis processing based on information such as a model type and a weight specified in learning processing, by acquiring a learned model per se. The import unit 160 acquires a result of the analysis processing related to the learned model as a result of the processing. In this case, when the first information processing device 100 performs machine learning, an external device can equally perform analysis related to this machine learning without having to let confidential information leak out.

In addition, the export unit 150 may output, as the export data, both the feature determined by the feature determining unit 130 and the learned model generated by the processing unit 140 (learning processing unit 141).

3. Variation Example

The following will describe variation examples.
3.1 Other System Exemplary Configuration In the example of FIG. 8 described above, an example is discussed where the US server 20 functions as the first information processing device 100, and the Korean server 40 (and the Japanese server 10 and the European server 30) function(s) as the second information processing device 200 which is an external device for the first information processing device 100. However, the technique in accordance with the present embodiment is not limited to this.

Figure 15:
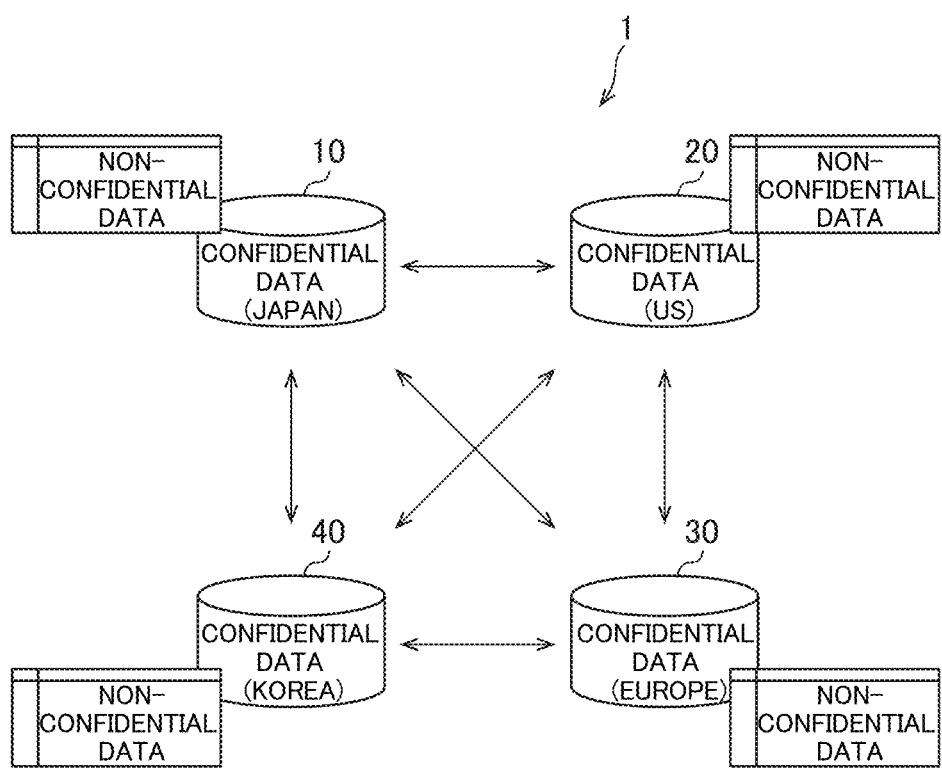
FIG. 15 is a specific, exemplary configuration of the information processing system.

FIG. 15 is a diagram representing another exemplary configuration of the information processing system 1. The information processing system 1 includes the Japanese server 10, the US server 20, the European server 30, and the Korean server 40, similarly to FIG. 8. In addition, the server in each country stores the raw document data acquired in that country as confidential information, also similarly to FIG. 8.

In the example of FIG. 15, the Japanese server 10 transmits the feature after the document data acquired in Japan is hashed to the US server 20, the European server 30, and the Korean server 40. Regarding the US server 20, the European server 30, and the Korean server 40, the feature after the document data acquired in the local country is hashed is similarly transmitted to the other three servers.

Since the Japanese server 10 acquires the feature based on the document data acquired in the US, Europe, and Korea, the Japanese server 10 is capable of performing processing on all the document data of Japan, the US, Europe, and Korea. This description equally applies to the US server 20, the European server 30, and the Korean server 40. For example, the Japanese server 10, the US server 20, the European server 30, and the Korean server 40 can each perform, for example, learning processing on the document data acquired in a plurality of countries or regions and inference processing using the learned model generated in this learning processing.

In addition, the Japanese server 10 may transmit a result of the performed processing to the US server 20, the European server 30, and the Korean server 40. The information transmitted here may be, for example, image data prepared by converting the document data acquired in Japan or metadata of such document data, a result of an analysis processing (data assessment, label assessment, cleansing, supervised data adjustment, and AI model type selection) on the document data acquired outside Japan, or other information. Similarly, the US server 20, the European server 30, and the Korean server 40 each transmit a result of processing to another server.

As described in the foregoing, in the example of FIG. 15, the Japanese server 10, the US server 20, the European server 30, and the Korean server 40 can each function as the first information processing device 100 and also function as the second information processing device 200. The information processing system 1 shown in FIG. 15 allows each device to convert confidential information to non-confidential information for mutual transmission/reception and to mutually transmit/receive a result of processing based on this non-confidential information and therefore allows for flexible changes in the system configuration and processing orders.

For instance, various processing can be performed at high speed by the server in each country performing different processing and sharing results of the processing. Specifically, the server in each country may specify an event on the basis of the legal system of that country to perform processing of determining relevance between this event and document data. In this case, the information processing system 1 can support an appropriate reaction, no matter in which country litigation or another problem has occurred. Alternatively, the reliability of the processing can be enhanced by performing the same processing in the servers in a plurality of countries.

In addition, FIGS. 8 and 15 show an example where the first information processing device 100 and the second information processing device 200 are located in different countries or regions. Alternatively, the information processing system 1 in accordance with the present embodiment is not limited to this example. For example, the first information processing device 100 and the second information processing device 200 may be under the management of different companies. For example, in the example of FIG. 13, suppose that a given, first company has performed machine learning using the first information processing device 100, but failed to achieve expected precision. In this case, the first company might contemplate entrusting the analysis to a second company that specializes in the analysis of machine learning. But, the document data for training is confidential information, and it is not preferable to allow the document data to leak out. In this regard, according to the technique in accordance with the present embodiment, it is, for example, the hashed feature and/or a learned model based on this feature that is(are) transmitted to the second information processing device 200 used by the second company. Therefore, it becomes possible to appropriately utilize an application (in this case, a machine learning analysis application) of an external company without having to allow the document data per se to leak out. Additionally, the technique in accordance with the present embodiment is broadly applicable to cases where the second information processing device 200 is an insecure environment to the first information processing device 100.

3.2 Hash Size

As described above with reference to FIGS. 5 to 7, the feature determining unit 130 may convert document data to a tensor that is a feature by determining control parameters including an output size of a hash function and applying the hash function in accordance with the control parameter to a result of morphological analysis. Note that the tensor is a type of feature, and the use of a feature in different form shall not be inhibited. The feature determining unit in this context is the feature determining unit 130 in the first information processing device 100, but the feature determining unit 230 in the second information processing device 200 may also perform similar processing. The following will describe the first information processing device 100 and its components, and the same description equally applies to the second information processing device 200 and its components.

Here, N, which is the output size of a hash function, that is, the size of a tensor (the number of elements in FIG. 6) may be a value that is independent from the content of the document data. For example, as described above, N is set to a value sufficiently greater than the expected number of morphemes. With this setting, the feature data has a fixed format for any document data, which enables common processing.

In addition, when the hash function has its output size specified (when a fixed-format tensor is used), the format of the feature is not altered even if a new morpheme is added. Therefore, it is not necessary to read processed document data again or to convert processed document data to a feature again. For example, when document data containing a new morpheme is added, the feature of the entire document data can be obtained by obtaining a feature corresponding to this document data and merging this feature and the existing feature.

In addition, the processing of converting numerous sets of document data to features can be performed in a parallel manner by using a fixed-format tensor. For example, when numerous sets of document data are divided into n (n is an integer greater than or equal to 2) groups, and features are obtained in a parallel manner using n devices, the features of the entire document data can be obtained by simply merging the outputs of these n devices. Consequently, high speed processing can be readily achieved.

It should be understood however that it has not been easy for the user to assign an appropriate value to N that strikes a good balance between precision and an amount of calculation because N needs to be large for improved precision through the restraining of morpheme collisions, but needs to be small for a reduced amount of calculation.

Accordingly, the feature determining unit 130 may perform processing of updating control parameters including the output size of the hash function until the learned model is determined to have a capability greater than or equal to a prescribed level in learned model evaluation processing. This configuration enables automating the specifying of N, which denotes the output size of the hash function, thereby reducing user workloads.

Figure 16:
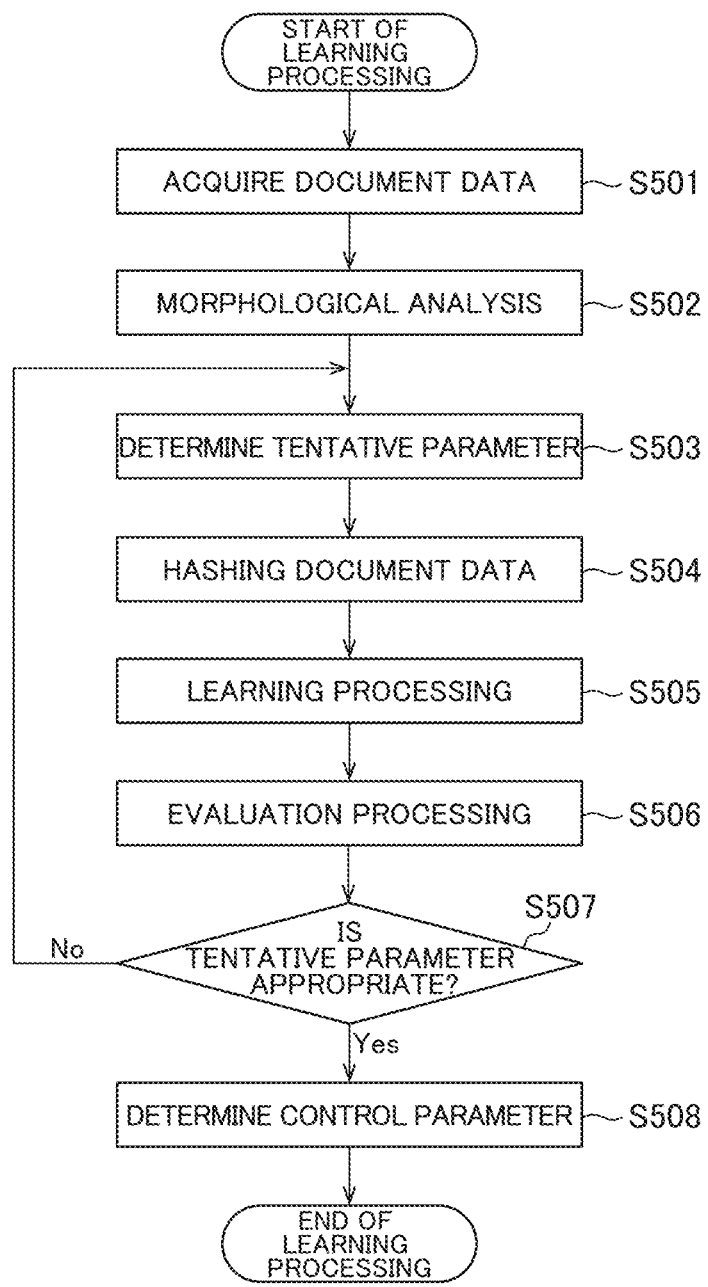
FIG. 16 is a flow chart representing automatic update processing for a control parameter.

FIG. 16 is a flow chart representing processing performed by the first information processing device 100 in this case. First, in step S501, the acquisition unit 110 acquires document data. Document data in this context is document data for training and in a narrow sense of the term, document data to which correct data is attached. In step S502, the analysis processing unit 120 performs morphological analysis of the document data.

In step S503, the feature determining unit 130 determines a tentative parameter as a control parameter including the value of N, which is the output size of a hash function. For example, the feature determining unit 130 selects one of a plurality of tentative parameters predetermined on the basis of, for example, a target language and the type of the document data. Alternatively, the user may arbitrarily specify the tentative parameter.

In step S504, the feature determining unit 130 converts the document data to a feature using the tentative parameter. Specifically, the feature determining unit 130 obtains the feature by applying a hash function with an output size being equal to N, which is included in the tentative parameter, to a result of the morphological analysis.

In step S505, the learning processing unit 141 generates a learned model by performing machine learning on the basis of the feature. In step S506, the learning processing unit 141 performs processing of evaluating the learned model generated in step S505. For example, the learning processing unit 141 may perform cross validation to obtain an index value representing precision of the learning and evaluate the learned model on the basis of this index value. Cross validation is a technique of dividing a plurality of sets of learning data into k (k is an integer greater than or equal to 2) units, updating the weights using k−1 units among the k units as training data, and obtaining the index value using the remaining one unit as test data (validation data). Cross validation is a publicly known technique, and a detailed description is omitted. In addition, the index value in this context may be one of various index values such as a recall, an accuracy rate, a precision, and an area under the curve (AUC).

In step S507, the learning processing unit 141 determines whether or not the tentative parameter was appropriate. For example, the learning processing unit 141 determines that the tentative parameter is appropriate when the index value obtained in step S506 is greater than or equal to a given threshold value.

When the tentative parameter is determined to be inappropriate (No in step S507), the first information processing device 100 returns to step S503 and continues the processing. In other words, the feature determining unit 130 performs processing of updating the tentative parameter. Specifically, the feature determining unit 130 may perform processing of selecting any one of a plurality of tentative parameters that is unselected. Alternatively, the feature determining unit 130 may update the tentative parameter by performing computation on the non-updated N in accordance with prescribed rules (e.g., addition of, or multiplication by, a prescribed value).

The processing after the tentative parameter is updated is the same as in the above-described example. Determination of a feature (step S504), learning processing (step S505), and evaluation processing (step S506) are performed, all using the tentative parameter.

When the tentative parameter is determined to be appropriate (Yes in step S507), the first information processing device 100 determines the tentative parameter at that time as a control parameter. Then, subsequent processing is performed using the determined control parameter.

3.3 Special Characters

For example, symbols and garbled characters may be detected in morphological analysis, and these have been conventionally excluded as noise. Note that a symbol may be, for example, a period ("。") or a comma ("、") in the Japanese language or a comma (","), a full stop ("."), or a colon (":") in the English language. In addition, a garbled character refers to a character that is not appropriately represented due to, for example, a difference in character coding.

However, if, for example, symbols and garbled characters were outputted as morphemes, there is a possibility that they are determined as morphemes according to some rules. Therefore, the feature determining unit 130 may perform the processing of converting the document data to a tensor, by applying a hash function to special characters including either a symbol or a garbled character or both in the result of morphological analysis. This configuration enables including information on special characters in the feature. Processing precision can be improved because the types of input information are enriched.

Note that in the present embodiment, whether or not to use a special character in processing may be used as a control parameter. For example, in the processing described above with reference to FIG. 16, the control parameters may include a parameter for determining whether to turn on/off use of a special character. This configuration enables automatically determining whether or not to use a special character, which allows for precision improvement while reducing user workloads.

3.4 Metadata

The description has so far discussed an example where the export data contains metadata of a feature and an example where the metadata of this document data is outputted when given document data is outputted as a result of the processing performed by the second information processing device 200. The metadata in this context is treated as, for example, data that differs from the feature. However, the technique in accordance with the present embodiment is not necessarily limited to this, and the feature may contain a metadata of document data.

The metadata in the present embodiment includes, for example, a character count and a line count in the document data and the distribution and statistical amounts (e.g., an average value, a center value, and a standard deviation) of these counts. In addition, the document data in the present embodiment may be data including a transcript of a conversation among a plurality of persons. For example, the acquisition unit 110 may acquire audio data that is a recorded conversation and perform speech recognition processing on this audio data to acquire the document data. In this case, the metadata of the document data includes, for example, a character count in a speech, a line count in the speech, and a duration of the speech, for each person. For example, if the document data corresponds to a conversation between a client and an employee, the metadata includes, for example, a character count in the client's speech, a character count in the employee's speech, and time distribution. In addition, the metadata may include, for example, a rate of a character count in the client's speech and a rate of a character count in the employee's speech, to a character count in the whole speech. For example, the metadata may include the name of a file path where the document data is stored and the date and time when an email is exchanged.

The feature determining unit 130 determines a metadata feature that is the feature related to metadata attached to the document data on the basis of this metadata. Then, both the feature and the metadata feature, corresponding to the result of the morphological analysis described so far, may be defined as new features. For example, the export unit 150 outputs export data that is data based on the feature and the metadata feature corresponding to the result of the morphological analysis. This configuration enables using not only morpheme information, but also metadata information, in various processing using the feature described so far. Processing precision can be improved because various information can be used.

For instance, the learning processing unit 141 (or the learning processing unit 241) performs machine learning on the basis of the feature and the metadata feature corresponding to a morpheme. This configuration enables including metadata different from morphemes in the feature, thereby allowing for improvement in learning precision.

However, the metadata could have a value that varies widely for each set of data. For example, the character count in a speech is more likely to be larger than the line count in the speech. In addition, the duration of the speech can change its value depending on whether the duration is measured in seconds or minutes. Therefore, when the value of the metadata is used as it is as the feature, the learning model may be strongly affected by the feature having a large value, which could hamper global learning of all the features.

Accordingly, in the present embodiment, the metadata feature may be calibrated information, not the raw value of the metadata. As an example, a case is considered where first to P-th pre-calibration features are acquired as pre-calibration features corresponding to metadata, and first to Q-th documents are acquired as document data. P represents the number of types of the features corresponding to metadata, and Q represents the number of sets of document data. Here, P and Q are an integer greater than or equal to 1. However, in reality, since it is assumed that there are both a plurality of types of metadata and a plurality of sets of document data, P and Q may each be an integer greater than or equal to 2.

The feature determining unit 130 may calibrate the first to P-th pre-calibration features on the basis of the number, P, of the pre-calibration features, the number, Q, of the sets of document data, a first norm obtained using an i-th pre-calibration feature that occurs in the first to Q-th documents (i is an integer greater than or equal to 1 and less than or equal to P), and a second norm obtained using the first to P-th pre-calibration features that occur in a j-th document (j is an integer greater than or equal to 1 and less than or equal to Q), to determine the metadata feature. This configuration enables normalizing the metadata feature appropriately. Specifically, the calibration based on the first norm can reduce differences in value between sets of metadata. Furthermore, by additionally performing calibration based on the second norm, information corresponding to the sum of the features of each document (e.g., sum of squares) can be unified. Consequently, the format of the obtained feature is the same as the format of the feature only to language information (morphemes), and, for example, the learning processing can be performed by the same processing as the processing for the language information also when the metadata is used.

FIGS. 17A to 17C are diagrams specifically illustrating calibration processing (normalizing processing) on a metadata feature. FIG. 17A represents a pre-calibration metadata feature. A pre-calibration metadata feature is, for example, the raw value of the metadata. Here, an example is described where document 1 to document 3 with four types of metadata features and three sets of document data are processed. In other words, an example is considered where P=4 and Q=3.

Referring to FIG. 17A, a metadata feature 1 has a value of 100, 300, and 500 respectively in document 1 to document 3. A metadata feature 2 has a value of 3, 2, and 1 respectively in document 1 to document 3. A metadata feature 3 has a value of 5000, 300, and 1 respectively in document 1 to document 3. A metadata feature 4 has a value of 0, 1, and 0 respectively in document 1 to document 3. In this example, the metadata features 1 and 3 have relatively large influence. In FIG. 17A, "$\|L2\|$" denotes an L2 norm which is the square root of the sum of squares. Since the L2 norm in the vertical direction corresponds to the first norm because the L2 norm is obtained using the i-th pre-calibration feature that occurs in the first to Q-th documents (i is an integer greater than or equal to 1 and less than or equal to P).

FIG. 17B is a diagram illustrating calibration processing using P, Q, and the first norm. FIG. 17B is a diagram showing results of the calibration processing of equation (1) below performed on each element in FIG. 17A. For example, for the metadata feature 1, FIG. 17B shows results obtained by multiplication by $(1/591) \times (3/4)$. The calibration processing shown in FIG. 17B uniforms the value of the square of the L2 norm in the vertical direction to equal 0.75 across all the metadata features. This calibration processing can reduce the influence of a scale for each metadata feature.

[Math. 1]

$$\text{FEATURE CALIBRATED BASED ON FIRST NORM} = \text{PRE-CALIBRATION FEATURE} \times \frac{1}{\text{FIRST NORM}} \times \frac{\sqrt{\text{NUMBER OF DOCUMENTS}}}{\sqrt{\text{NUMBER OF FEATURES}}} \quad (1)$$

In addition, the L2 norm in the horizontal direction in FIG. 17B is a norm obtained using the first to P-th pre-calibration features that occur in the j-th document (j is an integer greater than or equal to 1 and less than or equal to Q) and therefore corresponds to the second norm. FIG. 17B clearly shows variation, where the metadata features in document 1 overall have large values and the metadata features in document 3 overall have small values. In the present embodiment, the variation may be reduced by the calibration processing using the second norm.

FIG. 17C is a diagram illustrating calibration processing using the second norm. FIG. 17C is a diagram showing results of the calibration processing of multiplication by 1/(second norm) performed on each element in FIG. 17B. For example, for document 1, FIG. 17C shows results obtained by multiplication by $(1/\sqrt{1.25})$ of each element. The calibration processing shown in FIG. 17C uniforms the value of the square of the L2 norm in the horizontal direction to equal 1 across all the documents. Hence, the format of the feature can be the same as the format of the feature only to language information. Note that the calibration processing performed on the metadata features can be summarized as in equation (2) below.

[Math. 2]

$$\text{CALIBRATED FEATURE} = \text{PRE-CALIBRATION FEATURE} \times \frac{1}{\text{FIRST NORM}} \times \quad (2)$$

-continued $$\frac{\sqrt{\text{NUMBER OF DOCUMENTS}}}{\sqrt{\text{NUMBER OF FEATURES}}} \times \frac{1}{\text{SECOND NORM}}$$

The present embodiment has been discussed in detail. A person skilled in the art will readily appreciate that numerous modifications can be made without substantially departing from the new matter and effects of the present embodiment. Accordingly, all such modifications are included in the scope of the present disclosure. For example, terms that appear at least once in the description or drawings along with another broader or synonymous term can be replaced by the other term in any part of the description or drawings. Also, all the combinations of the present embodiment and the modifications are encompassed in the scope of the present disclosure. Also, the configuration and operation of information processing system, information processing device (first information processing device), and the second information processing device, among others, are not limited to those described in the present embodiment, and various modifications can be made.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing device comprising:
a hardware processor configured to:
acquire document data;
perform morphological analysis of the acquired document data, the morphological analysis comprising extracting, from the acquired document data, a plurality of morphemes included in the document data, each of the plurality of morphemes being a minimum linguistically meaningful unit of a sentence;
determine a feature representing the acquired document data based on a result of the morphological analysis and of applying a hash function, the feature comprising an array of values each obtained for a respective one of the plurality of morphemes;
output export data, to a second information processing device, that is data converted based on the determined feature;
acquire a result of first processing performed by the second information processing device based on the export data; and
perform second processing based on the result of the first processing acquired by the hardware processor,
wherein the export data comprises the feature and a search parameter generated based on the feature,
wherein the second information processing device generates a learned model through machine learning based on the feature and uses the learned model to perform the first processing, and
wherein the hardware processer is configured to acquire, as the result of the first processing, data included in the learned model that is output and satisfying a condition indicated by the search parameter.

2. The information processing device according to claim 1, wherein the hardware processor is configured to:
acquire, as the result of the first processing, either the learned model or information based on the learned model; and
input, to the learned model, a feature of processing-target document data that is document data to be processed, to perform processing on the processing-target document data.

3. The information processing device according to claim 2, wherein the hardware processor is configured to:
acquire, as the result of the first processing, information identified based on the search parameter and the learned model.

4. The information processing device according to claim 1, wherein the hardware processor is configured to:
perform learning processing of generating a learned model through machine learning based on the feature determined by the hardware processor and processing of updating the learned model based on the result of the first processing; and
acquire, as the result of the first processing, a result of analysis processing based on the export data.

5. The information processing device according to claim 4, wherein the hardware processor is configured to:
output the learned model generated by the hardware processor as the export data, data; and
acquire a result of the analysis processing related to the learned model as the result of the first processing.

6. The information processing device according to claim 4, wherein the hardware processor is configured to:
output the feature as the export data; and
acquire, as the result of the first processing, a result of the analysis processing related to the feature that is training data for the machine learning.

7. The information processing device according to claim 1, wherein the hardware processor is configured to:
determine, based on metadata attached to the document data, a metadata feature that is a feature corresponding to the metadata; and
output the export data that is data based on the feature corresponding to the result of the morphological analysis, and the metadata feature.

8. The information processing device according to claim 2, wherein the hardware processor is configured to determine a control parameter including an output size of the hash function and apply the hash function in accordance with the control parameter on the result of the morphological analysis, to convert the document data to a tensor that is one of types of the feature.

9. The information processing device according to claim 8, wherein the hardware processor is configured to perform processing of updating the control parameter including the output size of the hash function until the learned model acquires a capability determined to be greater than or equal to a prescribed level in processing of evaluating the learned model.

10. The information processing device according to claim 8, wherein the hardware processor is configured to apply the hash function to a special character including either one or both of a symbol and a garbled character in the result of the morphological analysis, to convert the document data to the tensor.

11. An information processing system comprising a first information processing device and a second information processing device, wherein the first information processing device comprises:
a hardware processor configured to:
acquire document data;
perform morphological analysis of the acquired document data, the morphological analysis comprising extracting, from the acquired document data, a plurality of morphemes included in the document data, each of the plurality of morphemes being a minimum linguistically meaningful unit of a sentence;

determine a feature representing the acquired document data based on a result of the morphological analysis and of applying a hash function, the feature comprising an array of values each obtained for a respective one of the plurality of morphemes;

output export data, to the second information processing device, that is data converted based on the determined feature;

acquire a result of first processing performed by the second information processing device based on the export data; and perform second processing based on the result of the first processing acquired by the import unit by the hardware processor, wherein the export data comprises the feature and a search parameter generated based on the feature, wherein the second information processing device is configured to generate a learned model through machine learning based on the feature and use the learned model to perform the first processing, and wherein the hardware processer is configured to acquire, as the result of the first processing, data included in the learned model that is output and satisfying a condition indicated by the search parameter.

12. An information processing method for an information processing device, the information processing method comprising:

acquiring, by a hardware processor, document data;

performing, by the hardware processor, morphological analysis of the acquired document data, the morphological analysis comprising extracting, from the acquired document data, a plurality of morphemes included in the document data, each of the plurality of morphemes being a minimum linguistically meaningful unit of a sentence;

determining, by the hardware processor, a feature representing the acquired document data based on a result of the morphological analysis and of applying a hash function, the feature comprising an array of values each obtained for a respective one of the plurality of morphemes;

exporting, by the hardware processor, to a second information processing device, export data that is data converted based on the determined feature;

importing, by the hardware processor, a result of first processing performed by the second information processing device based on the export data; and performing, by the hardware processor, second processing based on the imported result of the first processing, wherein the export data comprises the feature and a search parameter generated based on the feature, wherein the second information processing device generates a learned model through machine learning based on the feature and uses the learned model to perform the first processing, and wherein the information processing method further comprises acquiring, as the result of the first processing, data included in the learned model that is output and satisfying a condition indicated by the search parameter.

* * * * *